(12) United States Patent
Matsumoto et al.

(10) Patent No.: US 7,218,686 B2
(45) Date of Patent: May 15, 2007

(54) DECISION THRESHOLD VOLTAGE CONTROL CIRCUIT AND DECISION THRESHOLD VOLTAGE CONTROLLING METHOD OF CLOCK AND DATA RECOVERY CIRCUIT, OPTICAL RECEIVER, AND DECISION THRESHOLD VOLTAGE CONTROL PROGRAM

(75) Inventors: Yoshihiro Matsumoto, Tokyo (JP); Takashi Kuriyama, Tokyo (JP); Daijirou Inami, Tokyo (JP); Masaki Shiraiwa, Miyagi (JP)

(73) Assignee: Nec Corporation, Tokyo (JP)

( * ) Notice: Subject to any disclaimer, the term of this patent is extended or adjusted under 35 U.S.C. 154(b) by 822 days.

(21) Appl. No.: 10/097,394

(22) Filed: Mar. 15, 2002

(65) Prior Publication Data

US 2002/0131531 A1    Sep. 19, 2002

(30) Foreign Application Priority Data

Mar. 16, 2001   (JP)   ............................. 2001-076455

(51) Int. Cl.
*H04L 25/06* (2006.01)
*H03D 1/04* (2006.01)

(52) U.S. Cl. ...................................... 375/317; 375/346

(58) Field of Classification Search ................. 375/316, 375/317, 346, 348, 350
See application file for complete search history.

(56) References Cited

U.S. PATENT DOCUMENTS

| | | | |
|---|---|---|---|
| 4,479,266 A * | 10/1984 | Eumurian et al. ............ 327/72 |
| 4,823,360 A * | 4/1989 | Tremblay et al. ............ 375/214 |
| 5,001,726 A * | 3/1991 | Kawai et al. ................ 375/317 |
| 5,412,692 A * | 5/1995 | Uchida ........................ 375/317 |
| 5,425,056 A * | 6/1995 | Maroun et al. ............. 375/316 |
| 5,521,941 A * | 5/1996 | Wiatrowski et al. ........ 375/287 |
| 5,670,951 A * | 9/1997 | Servilio et al. ............. 375/287 |
| 5,736,875 A | 4/1998 | Sakamoto et al. |
| 5,898,734 A * | 4/1999 | Nakamura et al. .......... 375/287 |
| 5,933,458 A * | 8/1999 | Leurent et al. ............. 375/317 |
| 5,949,280 A * | 9/1999 | Sasaki ........................ 329/303 |
| 6,188,738 B1 * | 2/2001 | Sakamoto et al. .......... 375/371 |
| 6,420,962 B1 * | 7/2002 | Matsumoto et al. ..... 340/146.2 |
| 6,519,302 B1 * | 2/2003 | Bruce et al. ................ 375/355 |
| 2003/0016605 A1* | 1/2003 | Tateyama et al. ........ 369/47.26 |
| 2003/0043440 A1* | 3/2003 | Suzaki et al. ............... 359/189 |

FOREIGN PATENT DOCUMENTS

JP    60-178751 A    9/1985

(Continued)

*Primary Examiner*—Chieh M. Fan
*Assistant Examiner*—Jason M. Perilla
(74) *Attorney, Agent, or Firm*—Foley & Lardner LLP

(57) ABSTRACT

According to a decision threshold voltage controlling method of feeding an optimum decision threshold voltage to a clock and data recovery circuit which converts an optical input signal into an electric signal, extracts a clock component from an input data signal amplified to a predetermined amplitude, and identifies 1 or 0 in the input data signal at a timing of the clock, three decision points are suitably controlled, by selectively performing a process of controlling the spaces of the three decision points, a process of moving the three decision points with their spaces kept as they are, and a process of changing an error pulse measurement time, depending on a measurement result of the error pulse.

36 Claims, 24 Drawing Sheets

FOREIGN PATENT DOCUMENTS

| | | |
|---|---|---|
| JP | 1-154660 A | 6/1989 |
| JP | 02-007745 | 1/1990 |
| JP | 4-54043 A | 2/1992 |
| JP | 6-237231 A | 8/1994 |
| JP | 8-265375 A | 10/1996 |
| JP | 2002-204208 A | 7/2002 |

* cited by examiner $Cm < Cmin$ , $Cs < Cmin$ $Cmax > Cm > Cs > Cmin$ $Cmax > Cm = Cs > Cmin$ $Cmax > Cm = Cs \fallingdotseq Cmin$
OPTIMUM STATE

OPTICAL WAVEFORM JUST AFTER TRANSMISSION

OPTICAL WAVEFORM AFTER
600Km TRANSMISSION
AVERAGE OPTICAL POWER
−24 [dBm]

FIG. 26 (PRIOR ART)
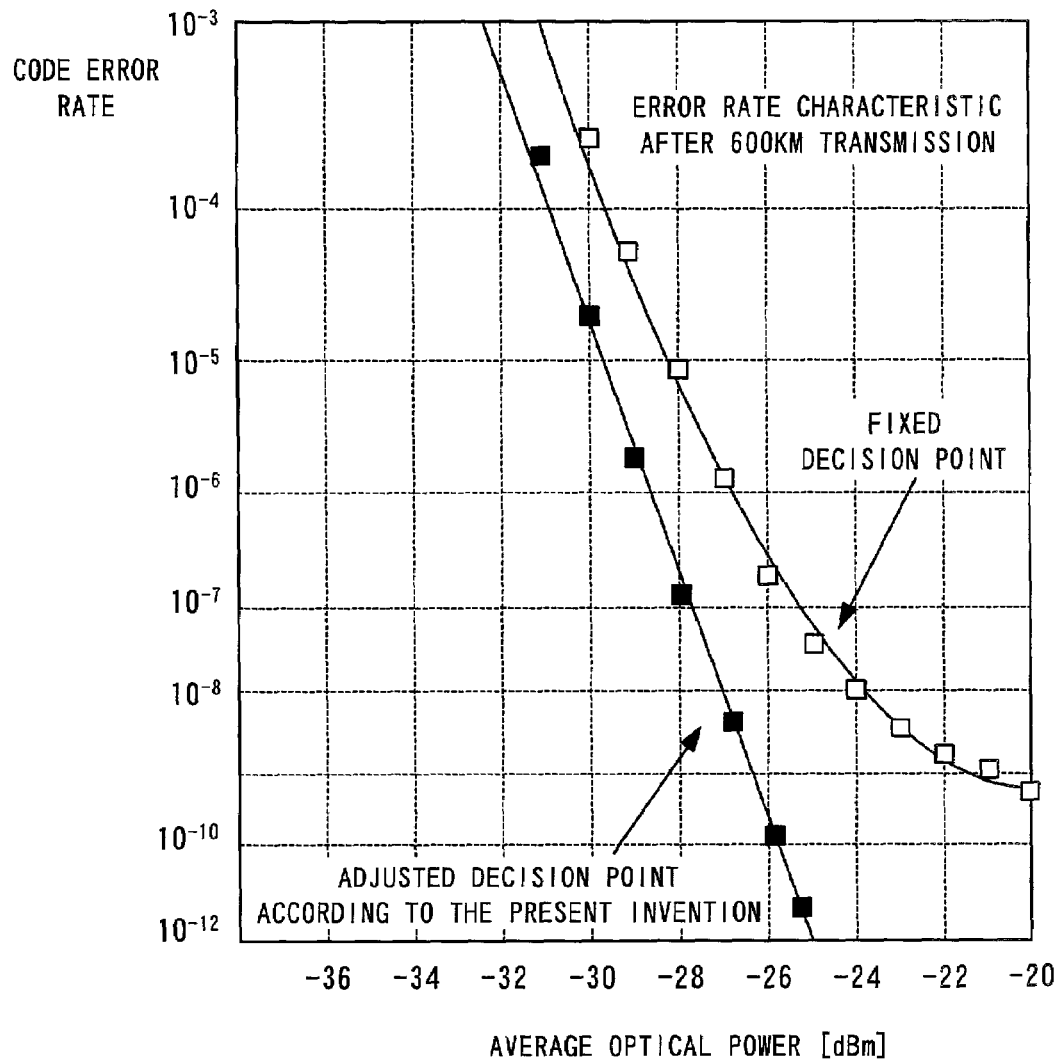
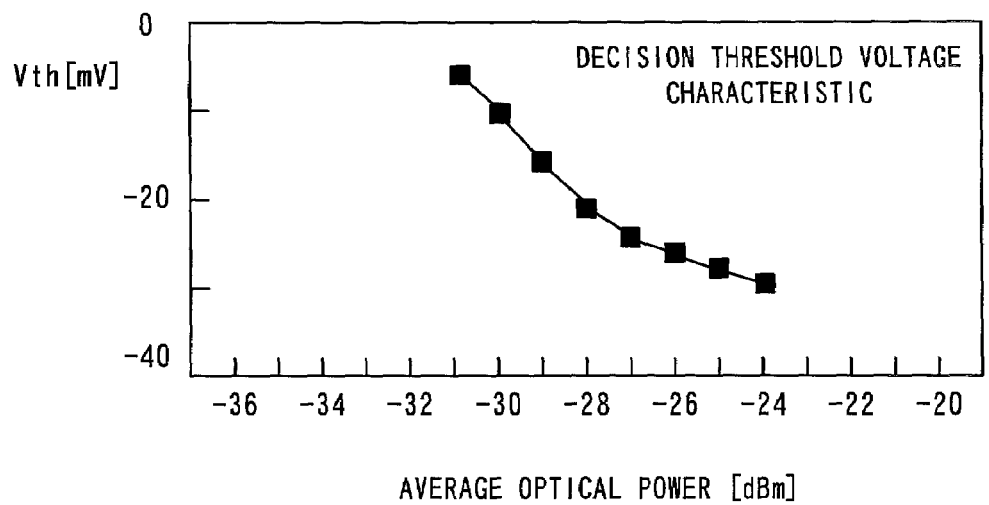

DECISION THRESHOLD VOLTAGE CONTROL CIRCUIT AND DECISION THRESHOLD VOLTAGE CONTROLLING METHOD OF CLOCK AND DATA RECOVERY CIRCUIT, OPTICAL RECEIVER, AND DECISION THRESHOLD VOLTAGE CONTROL PROGRAM

BACKGROUNDS OF THE INVENTION

1. Field of the Invention

The present invention relates to a control circuit for feeding an optimum decision threshold voltage to a clock and data recovery circuit, a decision threshold voltage controlling method, and a decision threshold voltage control program in the clock and data recovery circuit with a function of feeding a decision threshold voltage.

2. Description of the Related Art

In a recent optical transmission system including an optical amplifier or WDM (Wavelength Division Multiplexing) transmission technique, a factor that deteriorates an optical waveform is increased much more than in the conventional optical transmission system. The factor includes, by way of example, accumulation of noises caused by ASE (amplified spontaneous emission) by an optical amplifier, waveform distortion caused by dispersion and nonlinear effects in an optical fiber, which remarkably affects the quality of optical transmission with an increase of the optical power in the optical fiber, and crosstalk from the adjacent channels in the wavelength division multiplexing transmission.

In the optical waveform just after transmission, an eye opening, the area where an optical input signal can be surely distinguished into 1 or 0, is large, as shown in FIG. 19, while in the optical waveform after transmission of 600 km, the eye opening becomes very small, as shown in FIG. 25.

Even if such deterioration occurs in the optical waveform, a decision circuit of a receiving circuit is required to perform the optimum decision. Since the eye opening of the optical waveform varies depending on a light receiving power, the optimum decision threshold position for identifying 1 or 0 in the optical waveform varies depending on the light receiving power. The conventional optical transmission line, however, has some tolerance of the decision threshold position to the distortion of the optical waveform, and even if the decision threshold position is fixed at a value adjusted by a maker at a shipment of the product, it is no problem practically.

In the optical transmission system including an optical amplifier or WDM (wavelength division multiplexing) transmission, since a factor that deteriorates the optical waveform as mentioned above is increased, there occurs a curve in the error rate characteristic (floor) in the conventional decision circuit where the decision threshold position is fixed, which makes it difficult to assure the quality of a transmission line (upper portion of FIG. 26).

By consideration of the above situation, although various decision circuits for controlling a decision threshold position to the optimum one by way of hardware have been considered, it is necessary to design the parameters of a circuit minutely because the decision threshold position is processed through calculation, and the above circuits are defective in fine control.

SUMMARY OF THE INVENTION

In order to solve the above defects, a first object of the present invention is to provide a decision threshold voltage control circuit of a decision threshold voltage feeding-capable clock and data recovery circuit and its decision threshold voltage controlling method, free from the occurrence of floor, capable of controlling a decision threshold position to the optimum one at each optical receiving level and improving the error rate characteristic much more than the conventional decision circuit where a decision point is fixed, by use of the digital calculation processing for the decision threshold voltage control circuit.

A second object of the present invention is to provide a decision threshold voltage control circuit of a decision threshold voltage feeding-capable clock and data recovery circuit and its decision threshold voltage controlling method, capable of controlling a central decision point to the optimum position, by detecting an inner margin of the eye opening.

A third object of the present invention is to provide a decision threshold voltage control circuit of a decision threshold voltage feeding-capable clock and data recovery circuit and its decision threshold voltage controlling method, capable of increasing measurement accuracy and escaping from a bad situation quickly, by adjusting the measurement time based on the measurement result of an error count unit.

A fourth object of the present invention is to provide a decision threshold voltage control circuit of a decision threshold voltage feeding-capable clock and data recovery circuit and its decision threshold voltage controlling method, free from the necessity of using a large-sized counter in vain, by changing the measurement time depending on the number of the measured errors.

According to one aspect of the invention, a decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising the steps of:

a step of controlling three decision points suitably, by selectively performing a process of controlling spaces of the three decision points, a process of moving the three decision points with their spaces kept as they are, and a process of changing an error pulse measurement time, depending on a measurement result of the error pulse.

According to another aspect of the invention, a decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising the steps of:

a step of controlling three decision points suitably, by selectively performing a process of controlling spaces of the three decision points and a process of changing an error pulse measurement time, depending on a measurement result of the error pulse.

According to another aspect of the invention, a decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising the steps of:

a step of controlling three decision points suitably, by selectively performing a process of controlling spaces of the three decision points and a process of moving the three decision points with their spaces kept as they are, depending on a measurement result of an error pulse.

According to another aspect of the invention, a decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising the steps of:

a step of controlling three decision points suitably by performing a process of controlling spaces of the three decision points, depending on a measurement result of an error pulse.

According to another aspect of the invention, a decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising the steps of:

a step of counting the number of errors at nearby H level and the number of errors at nearby L level of the input data signal;

a step of changing a space between an upper decision point at nearby H level and a central decision point, or a space between a lower decision point at nearby L level and the central decision point, depending on the measurement result of the errors; and a step of setting the central decision point at an optimum position while detecting an inner margin of an eye opening of the input data signal.

In the preferred construction, the decision threshold voltage controlling method further comprises a step of moving the three decision points simultaneously, with the spaces between the respective upper and lower decision points and the central decision point kept as they are, depending on the measurement result of the errors.

In another preferred construction, the decision threshold voltage controlling method further comprises a step of changing a time of measuring the number of the errors, depending on the measurement result of the errors.

In another preferred construction, the decision threshold voltage controlling method further comprises a step of moving the three decision points simultaneously, with the spaces between the respective upper and lower decision points and the central decision point kept as they are, depending on the measurement result of the errors, and a step of changing a time of measuring the number of the errors, depending on the measurement result of the errors.

According to another aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises means for controlling three decision points suitably, by selectively performing processing of controlling spaces of the three decision points, processing of moving the three decision points with their spaces kept as they are, and processing of changing an error pulse measurement time, depending on a measurement result of the error pulse.

According to another aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises means for controlling three decision points suitably, by selectively performing processing of controlling spaces of the three decision points and processing of changing an error pulse measurement time, depending on a measurement result of the error pulse.

According to another aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises means for controlling three decision points suitably, by selectively performing processing of controlling spaces of the three decision points and processing of moving the three decision points with their spaces kept as they are, depending on a measurement result of an error pulse.

According to another aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises means for controlling three decision points suitably by controlling spaces of the three decision points, depending on a measurement result of an error pulse.

According to another aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises an error count unit of counting the number of errors at nearby H level and the number of errors at nearby L level of the input data signal, and a processing unit of changing a space between an upper decision point at the nearby H level and a central decision point, or a space between a lower decision point at the nearby L level and the central decision point, depending on the measurement result of the errors, wherein the central decision point is set at an optimum position while detecting an inner margin of an eye opening of the input data signal.

In the preferred construction, further the processing unit moves the three decision points simultaneously, with the spaces between the respective upper and lower decision points and the central decision point kept as they are, depending on the measurement result of the errors.

In the preferred construction, further the processing unit changes a time of measuring the number of the errors, depending on the measurement result of the errors.

In the preferred construction, further the processing unit moves the three decision points simultaneously, with the spaces between the respective upper and lower decision points and the central decision point kept as they are, depending on the measurement result of the errors, and changes a time of measuring the number of the errors, depending on the measurement result of the errors.

According to another aspect of the invention, a decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a decision threshold voltage control circuit of controlling three decision points suitably, by selectively performing processing of controlling spaces of the three decision points, processing of moving the three decision points with their spaces kept as they are, and processing of changing an error pulse measurement time, depending on a measurement result of the error pulse.

According to another aspect of the invention, a decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a decision threshold voltage control circuit of controlling three decision points suitably, by selectively performing processing of controlling spaces of the three decision points and processing of changing an error pulse measurement time, depending on a measurement result of the error pulse.

According to another aspect of the invention, a decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a decision threshold voltage control circuit of controlling three decision points suitably, by selectively performing processing of controlling spaces of the three decision points and processing of moving the three decision points with their spaces kept as they are, depending on a measurement result of an error pulse.

According to another aspect of the invention, a decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a decision threshold voltage control circuit of controlling three decision points suitably by controlling spaces of the three decision points, depending on a measurement result of an error pulse.

According to another aspect of the invention, a decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises an error count unit of counting the number of errors at nearby H level and the number of errors at nearby L level of the input data signal, a processing unit of changing a space between an upper decision point at the nearby H level and a central decision point, or a space between a lower decision point at the nearby L level and the central decision point, depending on the measurement result of the errors, and a decision threshold voltage control circuit of setting the central decision point at an optimum position while detecting an inner margin of an eye opening of the input data signal.

In the preferred construction, the processing unit moves the three decision points simultaneously, with the spaces between the respective upper and lower decision points and the central decision point kept as they are, depending on the measurement result of the errors.

In another preferred construction, the processing unit changes a time of measuring the number of the errors, depending on the measurement result of the errors.

In another preferred construction, the processing unit moves the three decision points simultaneously, with the spaces between the respective upper and lower decision points and the central decision point kept as they are, depending on the measurement result of the errors, and changes a time of measuring the number of the errors, depending on the measurement result of the errors.

According to another aspect of the invention, a decision threshold voltage control program to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the program comprises a function of counting the number of errors at nearby H level and the number of errors at nearby L level of the input data signal, and a function of changing a space between an upper decision point at the nearby H level and a central decision point, or a space between a lower decision point at the nearby L level and the central decision point, depending on the measurement result of the errors, wherein the central decision point is set at an optimum position while detecting an inner margin of an eye opening of the input data signal.

According to a further aspect of the invention, an optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprises a decision threshold voltage control circuit of controlling three decision points suitably, by selectively performing processing of controlling spaces of the three decision points, processing of moving the three decision points with their spaces kept as they are, and processing of changing an error pulse measurement time, depending on a measurement result of the error pulse.

According to a further aspect of the invention, an optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprises a decision threshold voltage control circuit of controlling three decision points suitably, by selectively performing processing of controlling spaces of the three decision points and processing of changing an error pulse measurement time, depending on a measurement result of the error pulse.

According to a further aspect of the invention, an optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprises a decision threshold voltage control circuit of controlling three decision points suitably, by selectively performing processing of controlling spaces of the three decision points and processing of moving the three decision points with their spaces kept as they are, depending on a measurement result of an error pulse.

According to a further aspect of the invention, an optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprises a decision threshold voltage control circuit of controlling three decision points suitably by controlling spaces of the three decision points, depending on a measurement result of an error pulse.

According to a further aspect of the invention, an optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprises an error count unit of counting the number of errors at nearby H level and the number of errors at nearby L level of the input data signal, a processing unit of changing a space between an upper decision point at the nearby H level and a central decision point, or a space between a lower decision point at the nearby L level and the central decision point, depending on the measurement result of the errors, and a decision threshold voltage control circuit of setting the central decision point at an optimum position while detecting an inner margin of an eye opening of the input data signal.

In another preferred construction, the processing unit moves the three decision points simultaneously, with the spaces between the respective upper and lower decision points and the central decision point kept as they are, depending on the measurement result of the errors, and changes a time of measuring the number of the errors, depending on the measurement result of the errors.

According to a further aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a D/A converter of generating a voltage depending on the number of errors at nearby H level and the number of errors at nearby L level of the input data signal, and a processing unit of changing a space between an upper decision point at the nearby H level and a central decision point, or a space between a lower decision point at the nearby L level and the central decision point, according to a voltage depending on the number of the errors, wherein the central decision point is set at an optimum position while detecting an inner margin of an eye opening of the input data signal.

In the preferred construction, the processing unit further includes a first operational amplifier of determining a voltage in proportion to a difference voltage between a voltage corresponding to the number of the H level errors and a voltage corresponding to the number of the L level errors as a voltage corresponding to the central decision point, and a second operational amplifier of determining a voltage in inverse proportion to a voltage corresponding to the number of HL level errors as a voltage corresponding to the upper decision point and a voltage in proportion to the voltage corresponding to the number of the HL level errors as a voltage corresponding to the lower decision point.

In another preferred construction, the processing unit includes a voltage divider of dividing the voltage corresponding to the upper decision point at the nearby H level and the voltage corresponding to the lower decision point at the nearly L level by some dividing ratio so as to supply a voltage corresponding to the central decision point.

According to a still further aspect of the invention, a decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprises a D/A converter of generating a voltage depending on the number of errors at nearby H level and the number of errors at nearby L level of the input data signal, and a processing unit of supplying each voltage corresponding to an upper decision point at nearby H level, a central decision point, and a lower decision point at nearby L level, according to a voltage corresponding to the number of the errors, while changing the spaces between the respective upper and lower decision points and the central decision point and moving the three decision points simultaneously with their spaces kept as they are, wherein the central decision point is set at an optimum position while detecting an inner margin of an eye opening of the input data signal.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 26 is a view showing the improvement result of the error rate.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
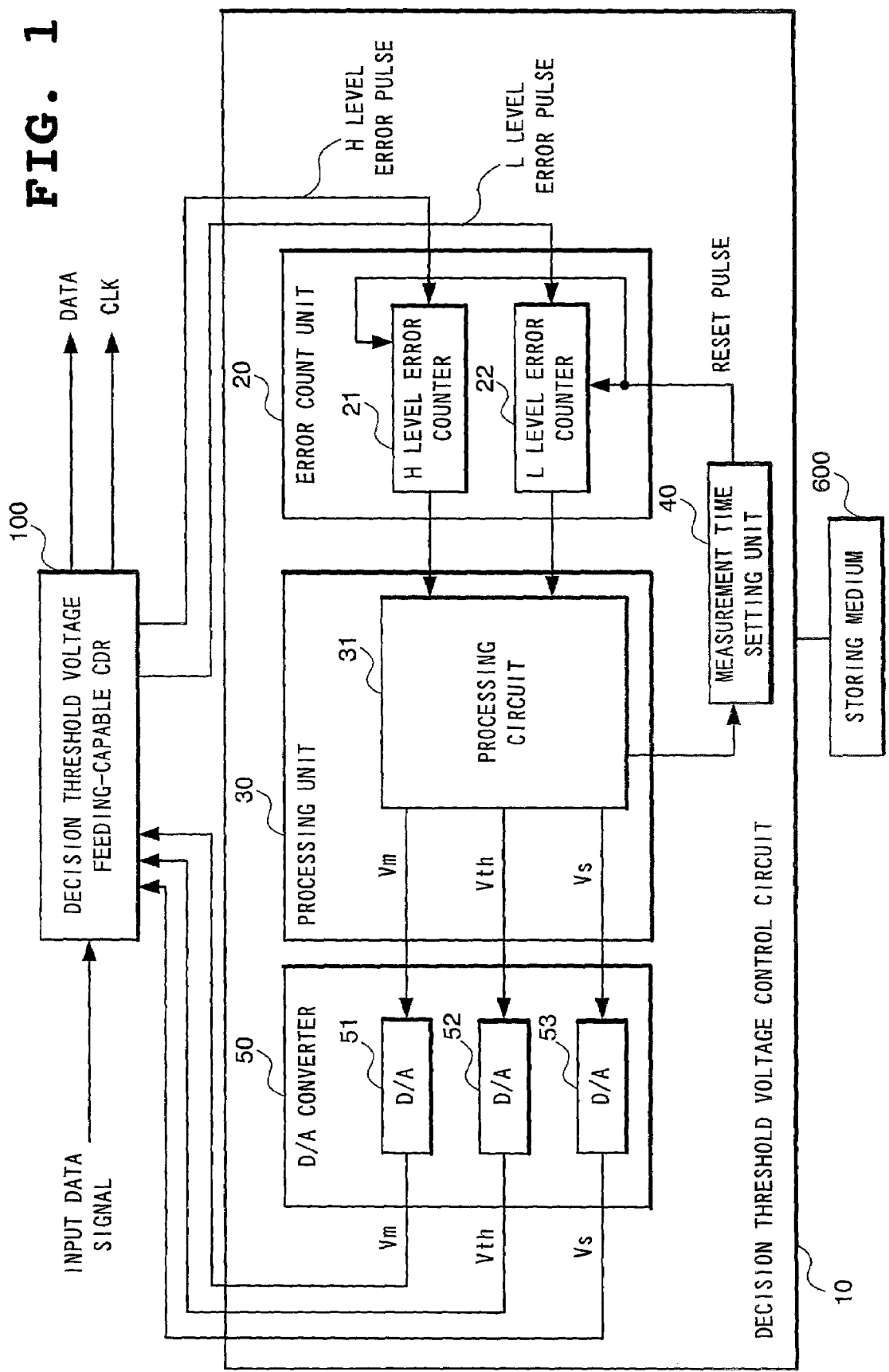
FIG. 1 is a block diagram showing the structure of a decision threshold voltage control circuit of a decision threshold voltage feeding-capable CDR according to a first embodiment of the present invention.

FIG. 1 is a block diagram showing the structure of a decision threshold voltage control circuit of a decision threshold voltage feeding-capable CDR according to a first embodiment of the present invention.

In FIG. 1, the reference numeral 100 designates decision threshold voltage feeding-capable CDR (clock and data recovery circuit) in which a function of feeding a decision threshold voltage is added to CDR that converts an optical input signal into an electric signal, extracts a clock component from the input data signal amplified to a predetermined amplitude, and discriminates 1 or 0 in the input data signal at the timing of the clock, and the reference numeral 10 designates a decision threshold voltage control circuit for feeding an optimum decision threshold voltage to the CDR according to a control algorithm, in the decision threshold voltage feeding-capable CDR 100.

Figure 2:
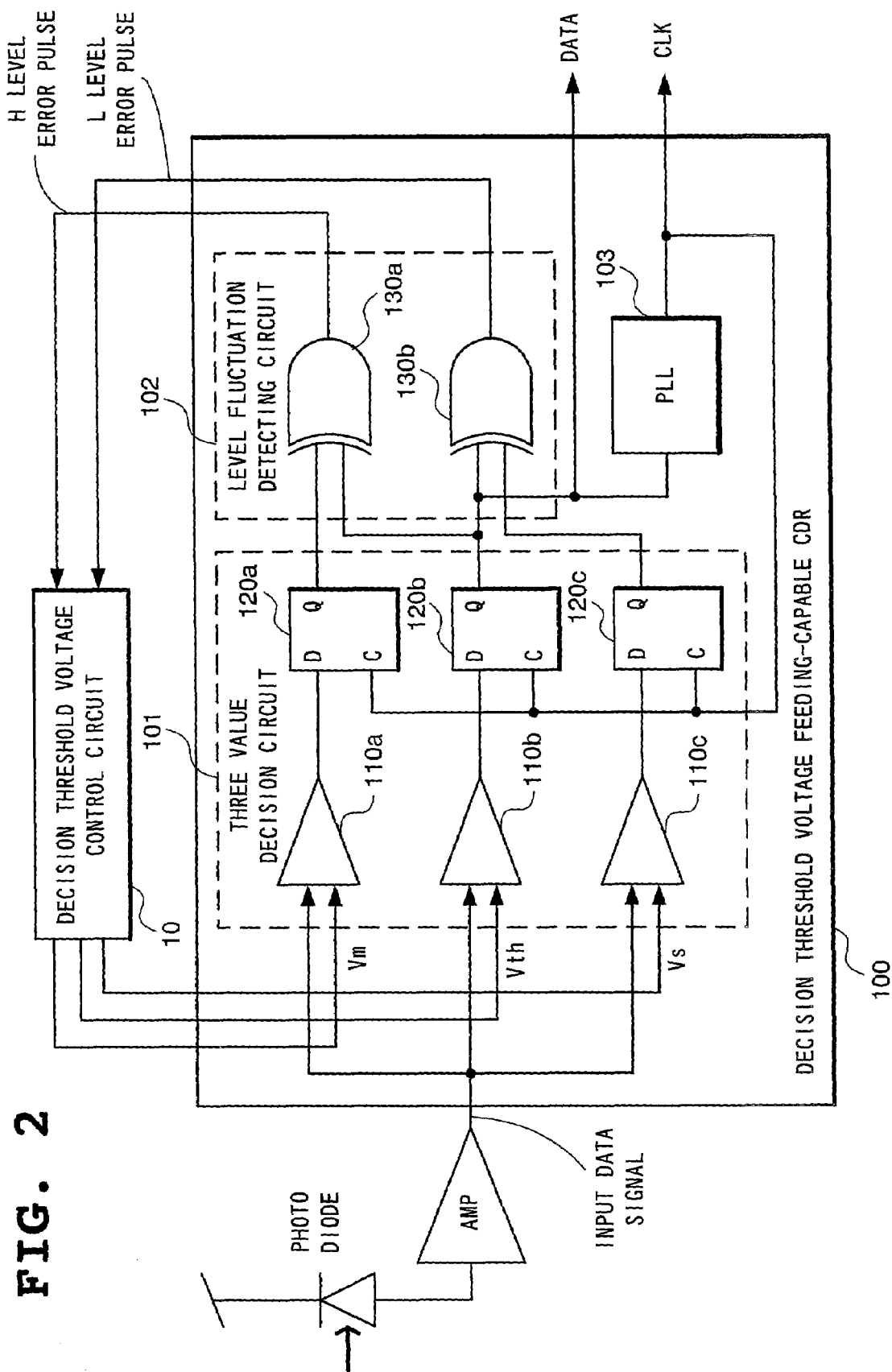
FIG. 2 is a block diagram showing the structure of the decision threshold voltage feeding-capable CDR according to the first embodiment of the present invention.

The decision threshold voltage feeding-capable CDR 100 has been hitherto provided, and one example of its structure is shown in FIG. 2. In the decision threshold voltage feeding-capable CDR 100, error is detected by checking agreement or disagreement between the respective decision results of the adjacent decision points through the EXCLUSIVE-OR operation, and in the case of disagreement, an error pulse is supplied.

The decision threshold voltage control circuit 10 comprises an error count unit 20, a processing unit 30 having a processing circuit 31, a measurement time setting unit 40, and a D/A converter 50.

The error count unit 20 includes an H level error counter 21 and an L level error counter 22. An error pulse at nearby H level (hereinafter, referred to as H level error pulse) from the decision threshold voltage feeding-capable CDR 100 is counted by the H level error counter 21 and an error pulse at nearby L level (hereinafter, referred to as L level error pulse) therefrom is counted by the L level error counter 22.

The processing circuit 31 of the processing unit 30 performs one or some of the following processes, depending on the number of the H level error pulses and the number of the L level error pulses.

(1) a process of changing the width between the central decision point and the decision point at nearby H level (upper decision point) or the width between the central decision point and the decision point at nearby L level (lower decision point)

(2) a process of moving three decision points simultaneously with the spaces between the central decision point and the respective upper and lower decision points kept as they are (3) a process of changing the measurement time depending on the number of the counted errors The measurement time setting unit 40 sets the measurement time of the error count unit at the optimum measurement time, depending on the number of the H level error pulses and the number of the L level error pulses.

The D/A converter 50 converts a voltage at the upper decision point Vm, a voltage at the central decision point Vth, and a voltage at the lower decision point Vs respectively supplied from the processing unit, into respective analog voltages. The D/A converter 50 includes a D/A converting circuit 51 for converting the upper decision point voltage Vm into analog voltage, a D/A converting circuit 52 for converting the central decision point voltage Vth into analog voltage, and a D/A converting circuit 53 for converting the lower decision point voltage Vs into analog voltage.

Although, in the above structure, the decision threshold voltage control circuit and the decision threshold voltage feeding-capable CDR 100 have been described as separate circuits, needless to say, the decision threshold voltage control circuit may be built in the decision threshold voltage feeding-capable CDR 100.

The structure of the decision threshold voltage feeding-capable CDR 100 will be briefly described with reference to FIG. 2.

In FIG. 2, the decision threshold voltage feeding-capable CDR 100 includes three-value decision circuit 101 for identifying the upper decision point at nearby H level, the central decision point at nearby central level, and the lower decision point at nearby L level of the input data signal, a level fluctuation detecting circuit 102 for detecting level fluctuation and supplying the detected result to the decision threshold voltage control circuit 10, and a PLL circuit 103.

The three-value decision circuit 101 is formed by comparators 110a, 110b, and 110c and flip-flops 120a, 120b, and 120c, and the level fluctuation detecting circuit 102 is formed by EXCLUSIVE-OR circuits 130a and 130b.

Figure 3:
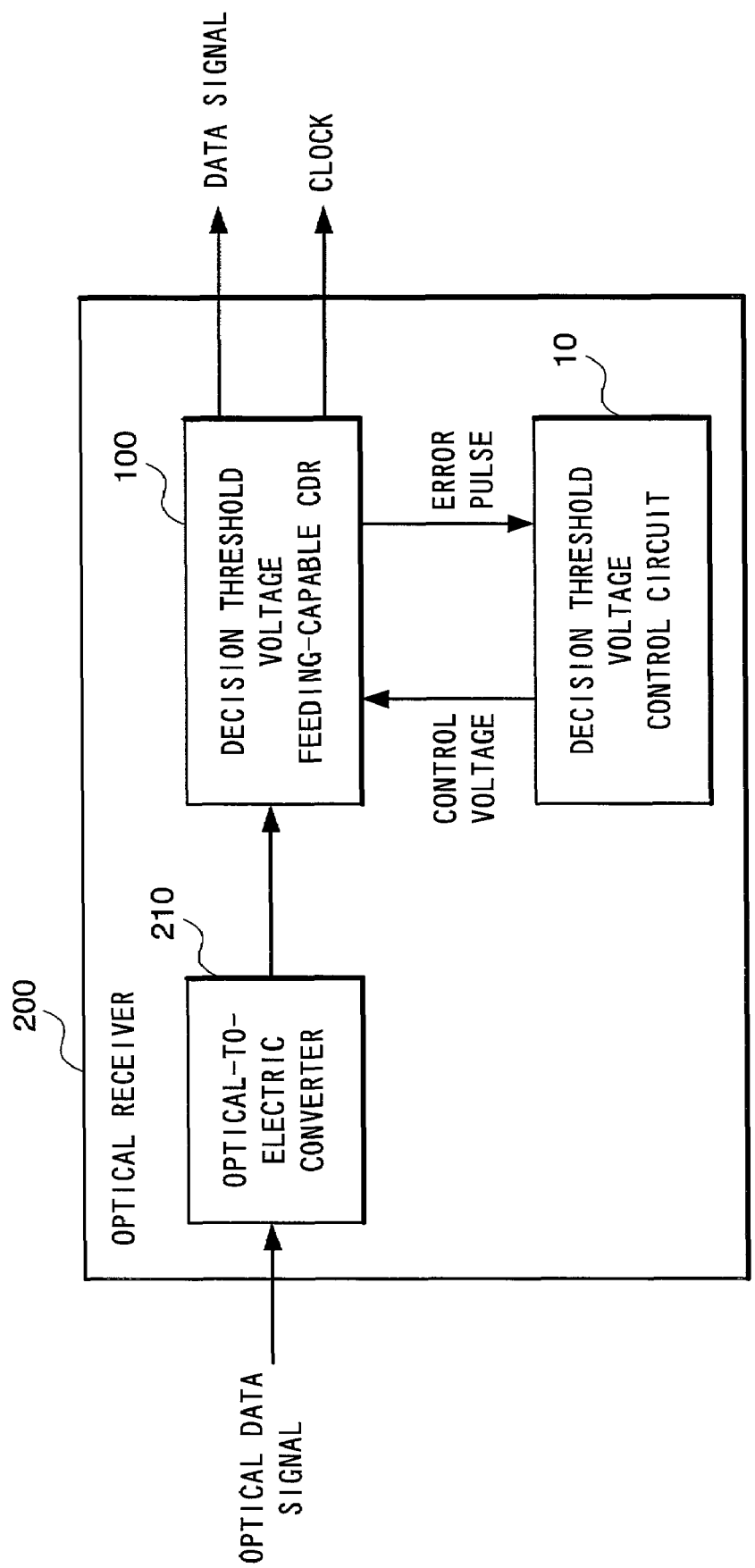
FIG. 3 is a block diagram showing the structure of an optical receiver to which the decision threshold voltage control circuit according to the embodiment of the present invention is adopted.

The structure of an optical receiver to which the decision threshold voltage control circuit 10 according to the present invention is adopted is shown in FIG. 3. The optical receiver 200 includes an optical-to-electric converter 210 of receiving an optical data signal for converting it into an electric signal and supplying it as an input data signal, the above-mentioned decision threshold voltage feeding-capable CDR 100, and the decision threshold voltage control circuit 10, wherein a data signal having been identified is supplied from the decision threshold voltage feeding-capable CDR 100.

The operation of the decision threshold voltage control circuit according to the embodiment of the present invention will be described by using FIGS. 4 to 10.

Figure 4:
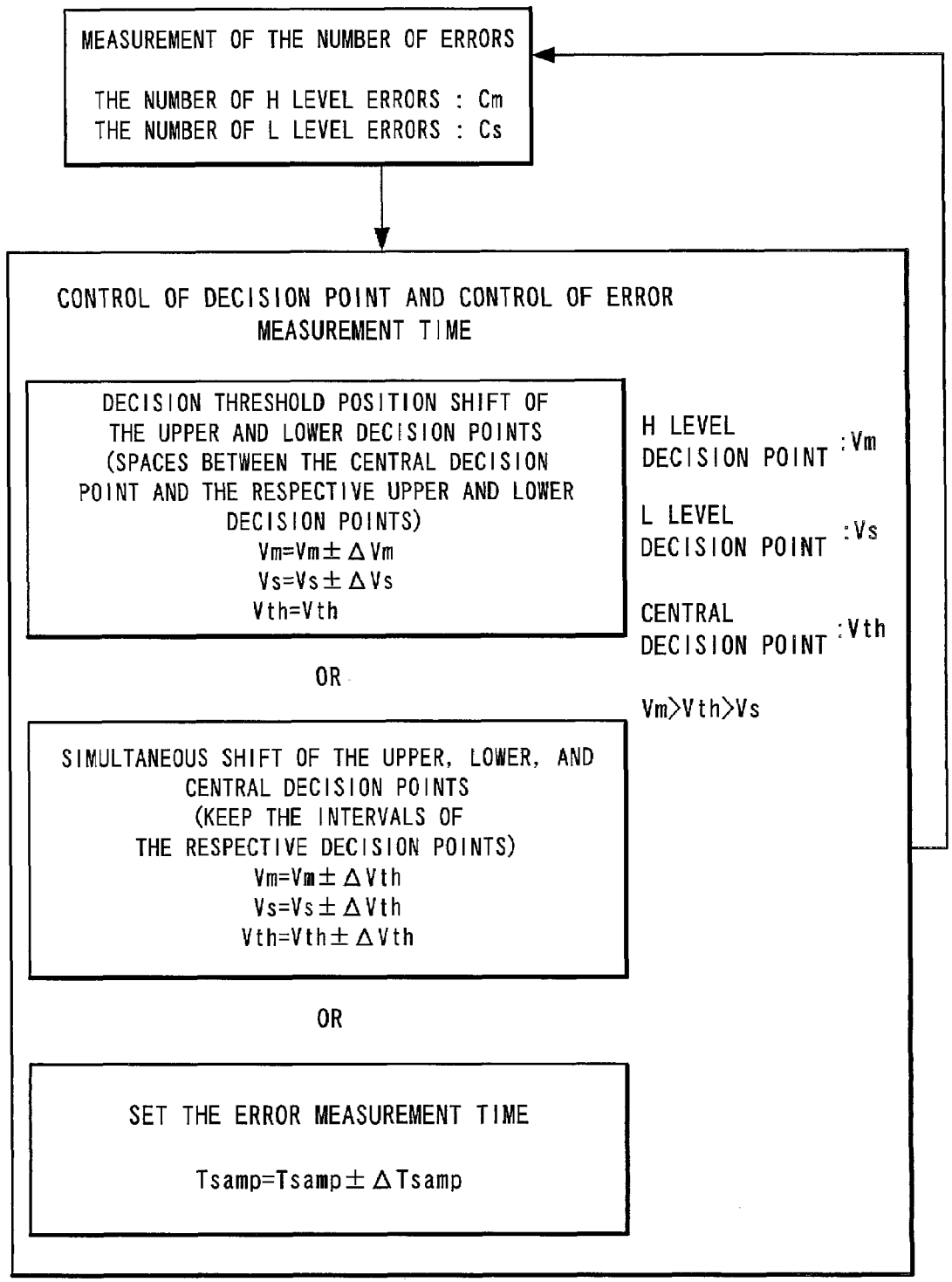
FIG. 4 is a view showing the basic concept of a control algorithm in a processing unit of the decision threshold voltage control circuit according to the first embodiment of the present invention.
Figure 5:
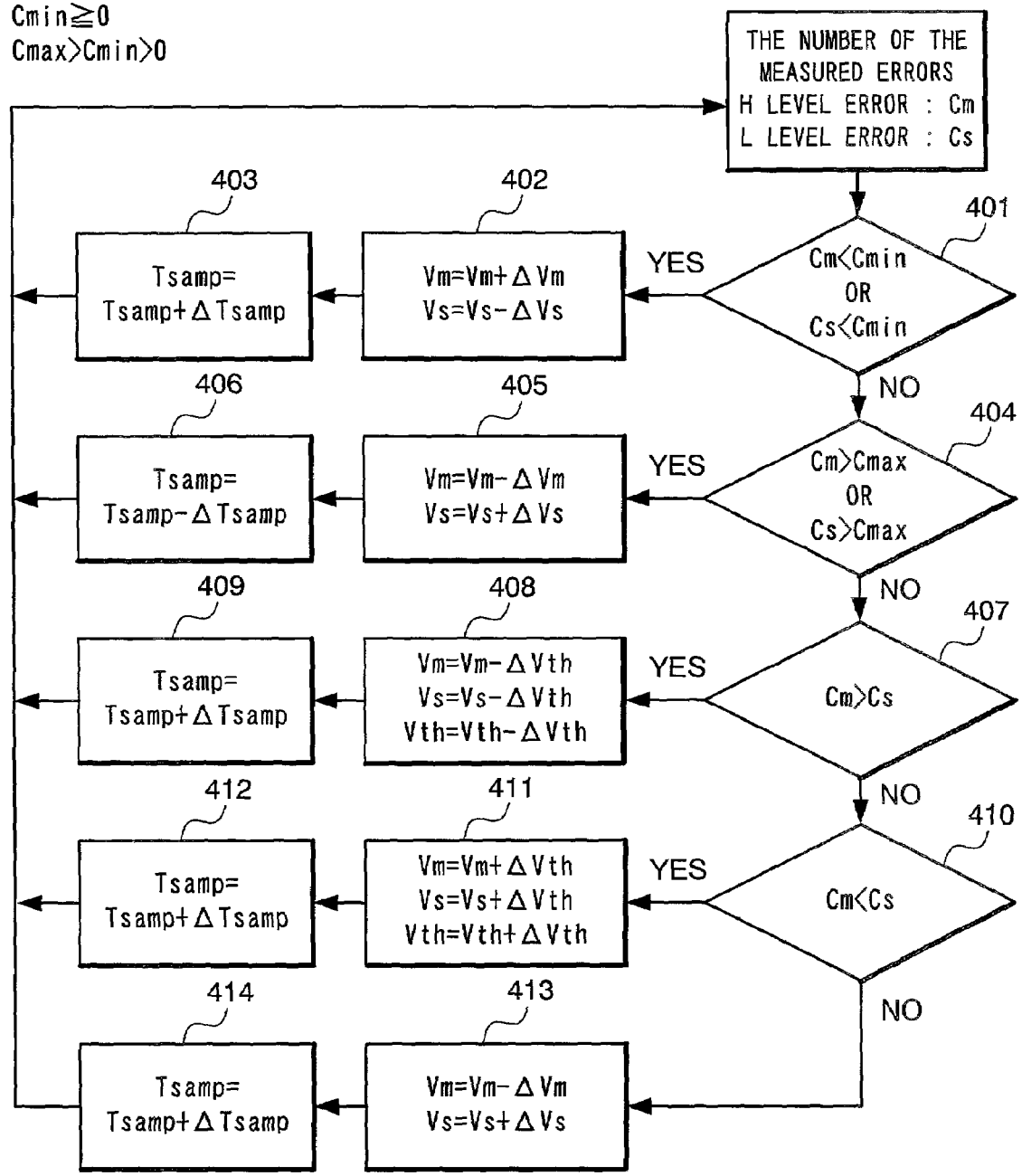
FIG. 5 is a flow chart for use in describing the operation of the decision threshold voltage control circuit according to the first embodiment of the present invention.

FIG. 4 is a view showing the basic concept of a control algorithm in the processing unit 30 of the decision threshold voltage control circuit 10 which is characteristic of the present invention, FIG. 5 is one example of a flow chart by use of the control algorithm of the present invention. FIGS. 6 to 9 are views respectively showing the positional relationship among the eye opening, the upper decision point voltage Vm, the central decision point voltage Vth, and the lower decision point voltage Vs in each process of the flow chart of FIG. 5. The value of the central decision point voltage Vth may be set freely, being adjusted depending on the level and the data quality of an input optical data signal, namely, depending on a system adopting the decision threshold voltage feeding-capable CDR 100.

Figure 6:
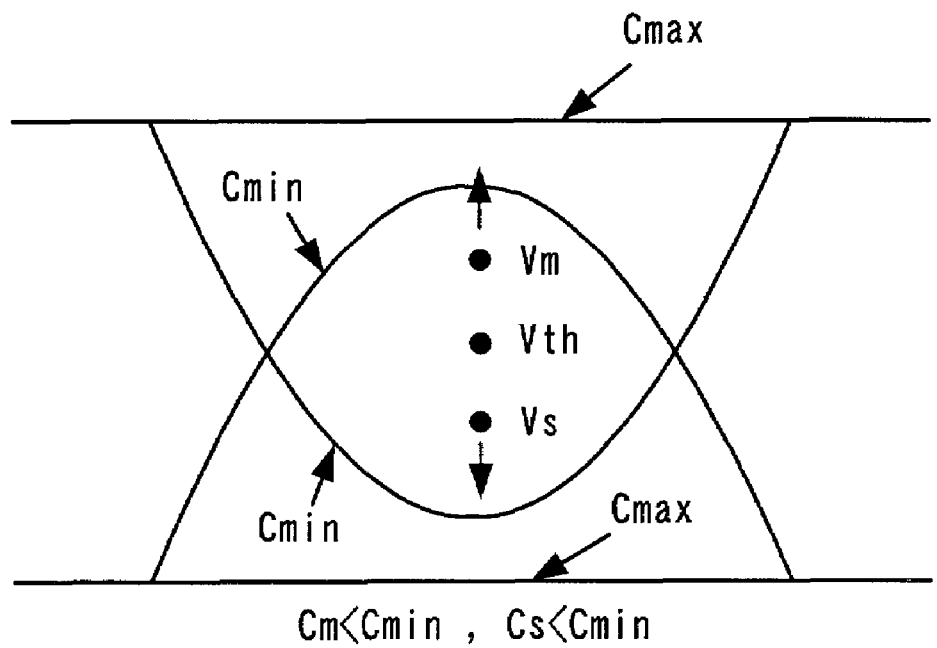
FIG. 6 is a view showing the positional relationship among the eye opening, the upper decision point voltage, the central decision point, and the lower decision point V in each process of the flow chart of FIG. 5.

Here, defined are as follows:
the number of H level errors: Cm
the number of L level errors: Cs
the maximum measured value: Cmax (Cmax>Cmin>0)
the minimum measured value: Cmin (Cmin>=0)
voltage at H level decision point: Vm
voltage at L level decision point: Vs
voltage at central decision point: Vth (Vm>Vth>Vs)
error measurement time: Tsamp Assume that the respective positions of the upper decision point voltage Vm, the central decision point voltage Vth, and the lower decision point voltage Vs are as shown in FIG. 6 in the initial state. Namely, the three points are within the eye opening, and the central decision point voltage Vth is a little deviated from the optimum position.

In this state, when the number of the H level errors, Cm and the number of the L level errors, Cs are counted, since Cm<Cmin and Cs<Cmin, the first check in Step 401 is judged to be Y (Yes), and an operation of raising Vm by ΔVm and lowering Vs by ΔVs (widening the spaces between each decision point) is performed, in order to detect the margin of the eye opening (Step 402). This operation results in the state of FIG. 7.

Since the number of the H level errors, Cm and the number of the L level errors, Cs are both less than the minimum measured value Cmin, the measurement time Tsamp is extended by ΔTsamp in order to increase the number of the error pulses counted within the measurement time for the purpose of enhancing the measuring accuracy (Step 403).

Figure 7:
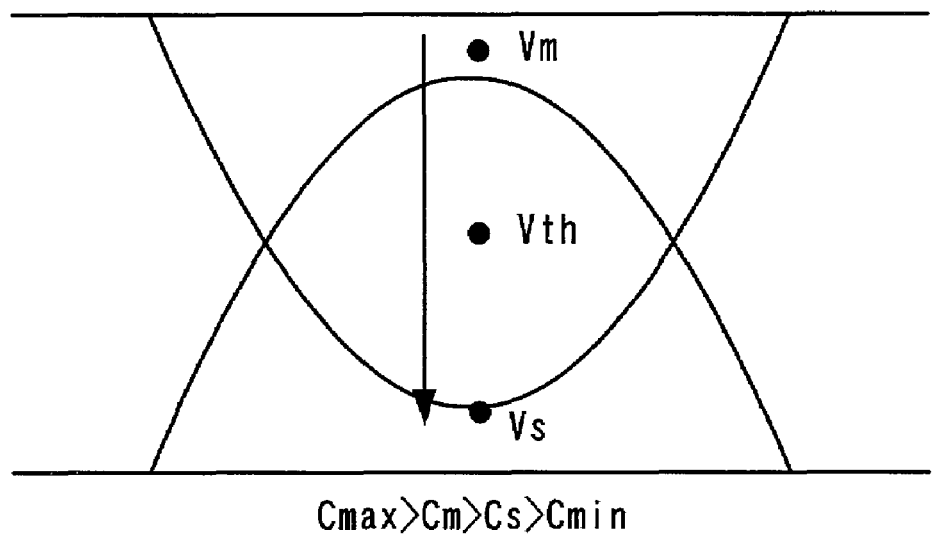
FIG. 7 is a view showing the positional relationship among the eye opening, the upper decision point voltage, the central decision point, and the lower decision point V in each process of the flow chart of FIG. 5.

In FIG. 7, since the upper decision point voltage Vm and the lower decision point voltage Vs are deviated outwardly from the eye opening, when the number of the H level errors, Cm and the number of the L level errors, Cs are counted, it proves to be Cmax>Cm>Cs>Cmin. As a result, the first check in Step 401 and the second check in Step 402 are judged to be N (No) and the third check in Step 407 is judged to be Y (Yes). A control of lowering the three points; the upper decision point voltage Vm, the central decision point voltage Vth, and the lower decision point voltage Vs by ΔVth simultaneously is performed (Step 408), which results in the state of FIG. 8.

Since the number of the H level errors, Cm and the number of the L level errors, Cs are not more than the maximum measured value Cmax, the measurement time Tsamp is extended by ΔTsamp in order to enhance the measurement accuracy (Step 409).

Figure 8:
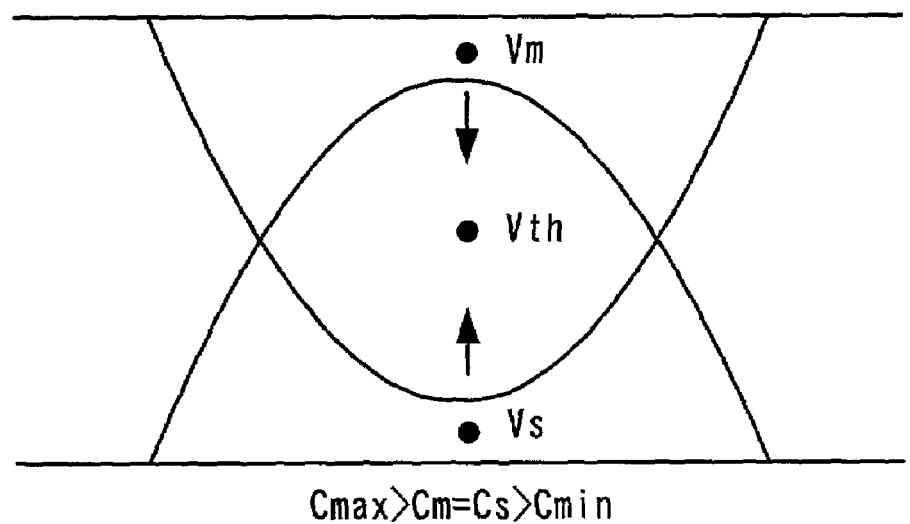
FIG. 8 is a view showing the positional relationship among the eye opening, the upper decision point voltage, the central decision point, and the lower decision point V in each process of the flow chart of FIG. 5.

Though the central decision point voltage Vth is near the optimum position in FIG. 8, the upper decision point voltage Vm and the lower decision point voltage Vs don't necessarily mean to detect the margin of the eye opening. At this time, the measurement result of the number of the H level errors, Cm and the number of the L level errors, Cs turns to be Cmax>Cm=Cs>Cmin, and the first check in Step 401 through the fourth check in Step 410 are judged to be all N (No). The upper decision point voltage Vm is lowered by ΔVm and the lower decision point voltage Vs is raised by ΔVs in order to detect the margin of the eye opening (the space between each decision point is shrunken) (Step 413).

In order to enhance the measuring accuracy, the measurement time Tsamp is extended by ΔTsamp similarly (Step 414).

Figure 9:
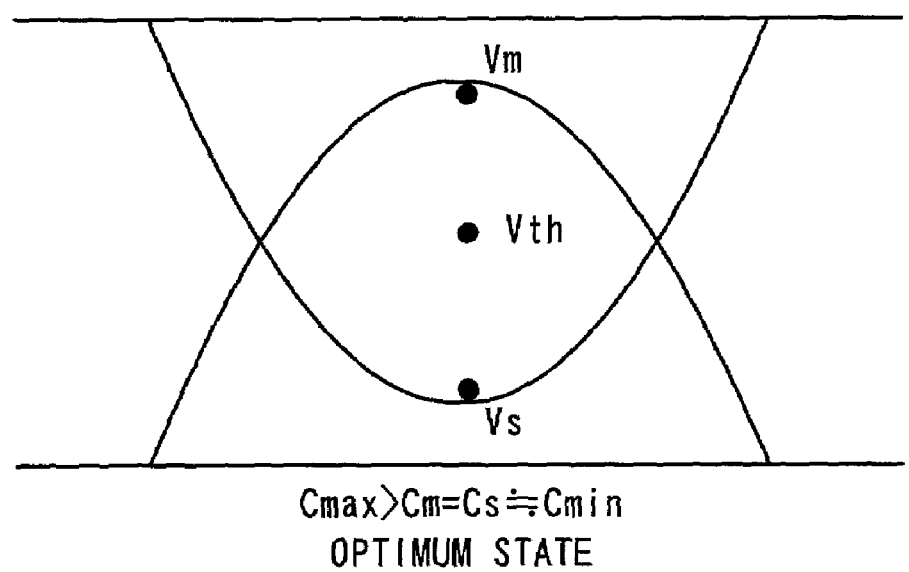
FIG. 9 is a view showing the positional relationship among the eye opening, the upper decision point voltage, the central decision point, and the lower decision point V in each process of the flow chart of FIG. 5.

According to the repetition of the above operations, the central decision point voltage Vth becomes the optimum decision point in such a state that the number of the measured errors at the upper decision point voltage Vm and the lower decision point voltage Vs satisfy Cmax>Cm=Cs≈Cmin (FIG. 9).

In FIG. 5, when one of the number of the H level errors, Cm and the number of the L level errors, Cs is beyond the maximum measured value Cmax (Yes in Step 404), the upper decision point voltage Vm is lowered by ΔVm and the lower decision point voltage Vs is raised by ΔVs (the space between each decision point is shrunken) (Step 405), and the measurement time Tsamp is shortened by ΔTsamp (step 406). This enables quick escape from a bad state and prevents from overflow of the counter.

According to the above operation, since the central decision point voltage Vth becomes the optimum decision point, the embodiment can improve an error rate better than the conventional case of fixing the decision point, as illustrated in FIG. 26.

The respective controls of the decision points and the respective controls of the error measurement time may be performed separately or simultaneously.

More specifically, a control of lowering the upper decision point voltage Vm by ΔVm and raising the lower decision point voltage Vs by ΔVs (the space between each decision point is shrunken) and a control of lowering the three points; the upper decision point voltage Vm, the central decision point voltage Vth, and the lower decision point voltage Vs by ΔVth simultaneously may be performed at once.

For example, when one of the number of the H level errors, Cm and the number of the L level errors, Cs is beyond the maximum measured value Cmax in FIG. 5, the upper decision point voltage Vm is lowered by ΔVm and the lower decision point voltage Vs is raised by ΔVs (the space between each decision point is shrunken), and the measurement time Tsamp is shortened by ΔTsamp. In addition to the above control, if the control of lowering the three points; the upper decision point voltage Vm, the central decision point voltage Vth, and the lower decision point voltage Vs by ΔVth simultaneously is performed at the same time, this would enable a quicker escape from a bad state.

In the measurement result, when the number of the H level errors, Cm and the number of the L level errors, Cs satisfy Cmax>Cm>Cs>Cmin, the measurement time may be left as it is because the both numbers are adequate as the measured number.

In FIG. 5, the order of the first check and the second check may be inverted and similarly the order of the third check and the fourth check may be inverted.

Alternatively, the check may be performed in the order of the fist check (Step 401), the third check (Step 407) and the fourth check (Step 410) (or the fourth check and the third check), and the second check (Step 404). Or it may be performed in the order of the second check (Step 404), the third check (Step 407) and the fourth check (Step 410) (or the fourth check and the third check), and the first check (Step 401).

The value ΔVm need not be equal to the value Δvs. When the values ΔVm and ΔVs are set at equal, the central decision point voltage Vth proves to be in the middle of the upper decision point voltage Vm and the lower decision point voltage Vs.

It is needless to say that the values ΔVm, ΔVs, ΔVth vary depending on how much degree to set the control accuracy. For example, generally the values are set within the range of $\frac{1}{10}$ to $\frac{1}{1000}$ of an input data signal. The values of the Tsamp and ΔTsamp also vary depending on how much degree to set the control accuracy. For example, the measurement time Tsamp varies within the range from a time the minimum error rate (for example, BER=$10^{-2}$ to $10^{-3}$) can be measured in the operation of the optical receiver to a time the error rate almost free from error (for example, BER=$10^{-12}$ to $10^{-15}$) can be measured. Further, ΔTsamp is set per $\frac{1}{10}$ to $\frac{1}{1000}$ of the above-mentioned time range, by way of example.

Figure 10:
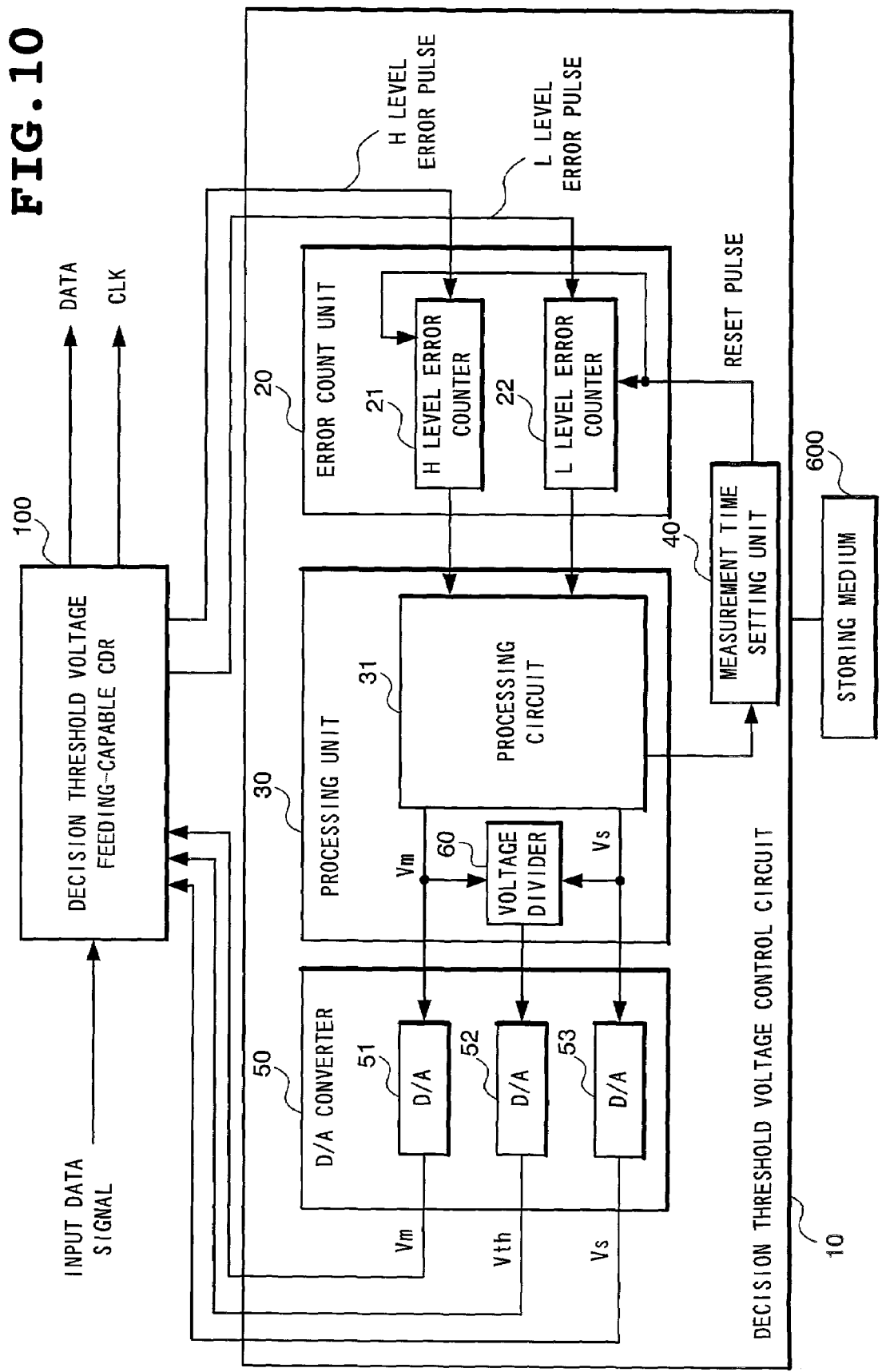
FIG. 10 is a block diagram showing the structure of the decision threshold voltage control circuit of a decision threshold voltage feeding-capable CDR according to the second embodiment of the present invention.
Figure 11:
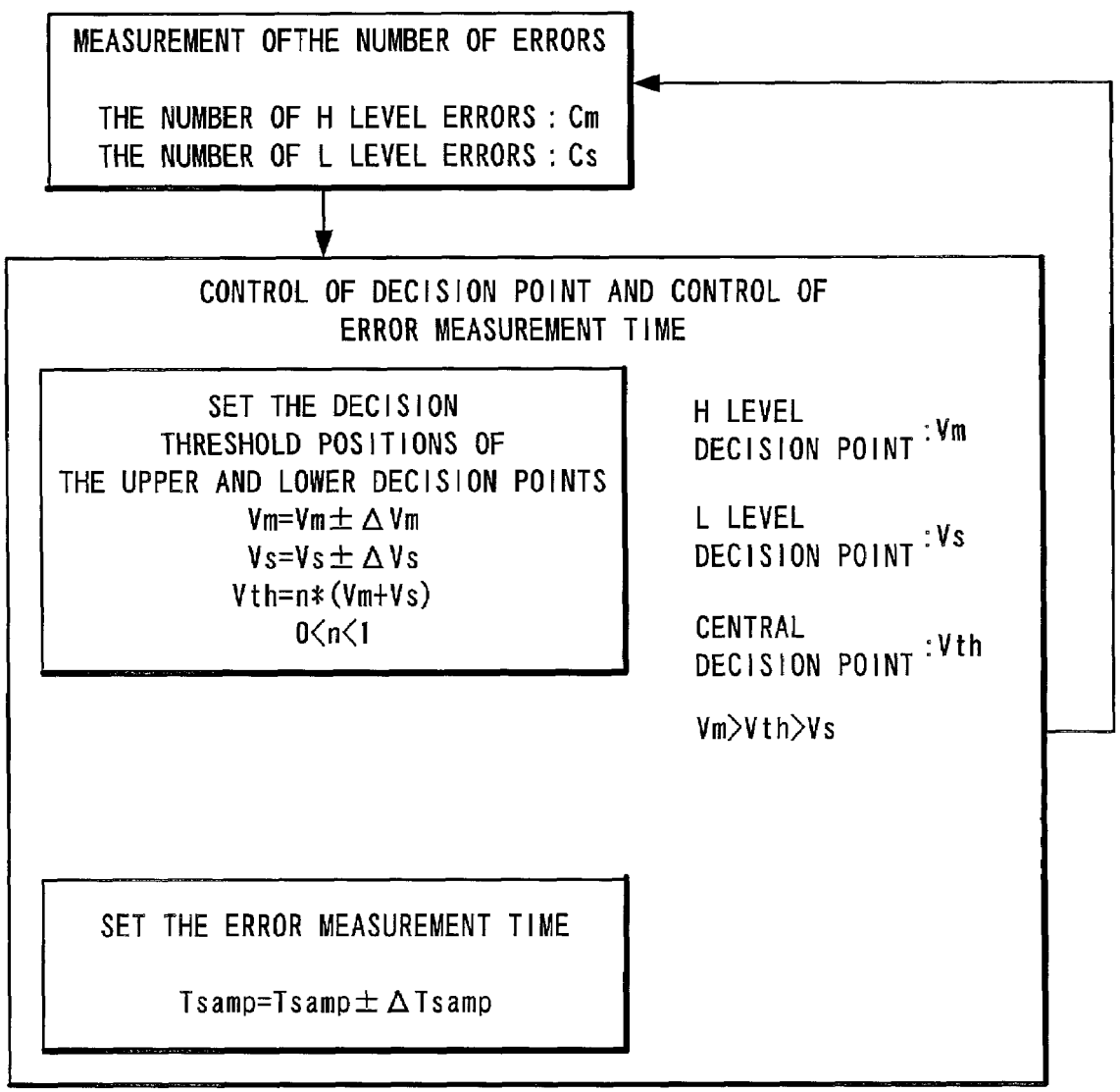
FIG. 11 is a view showing the basic concept of a control algorithm in a processing unit of the decision threshold voltage control circuit according to the second embodiment of the present invention.
Figure 12:
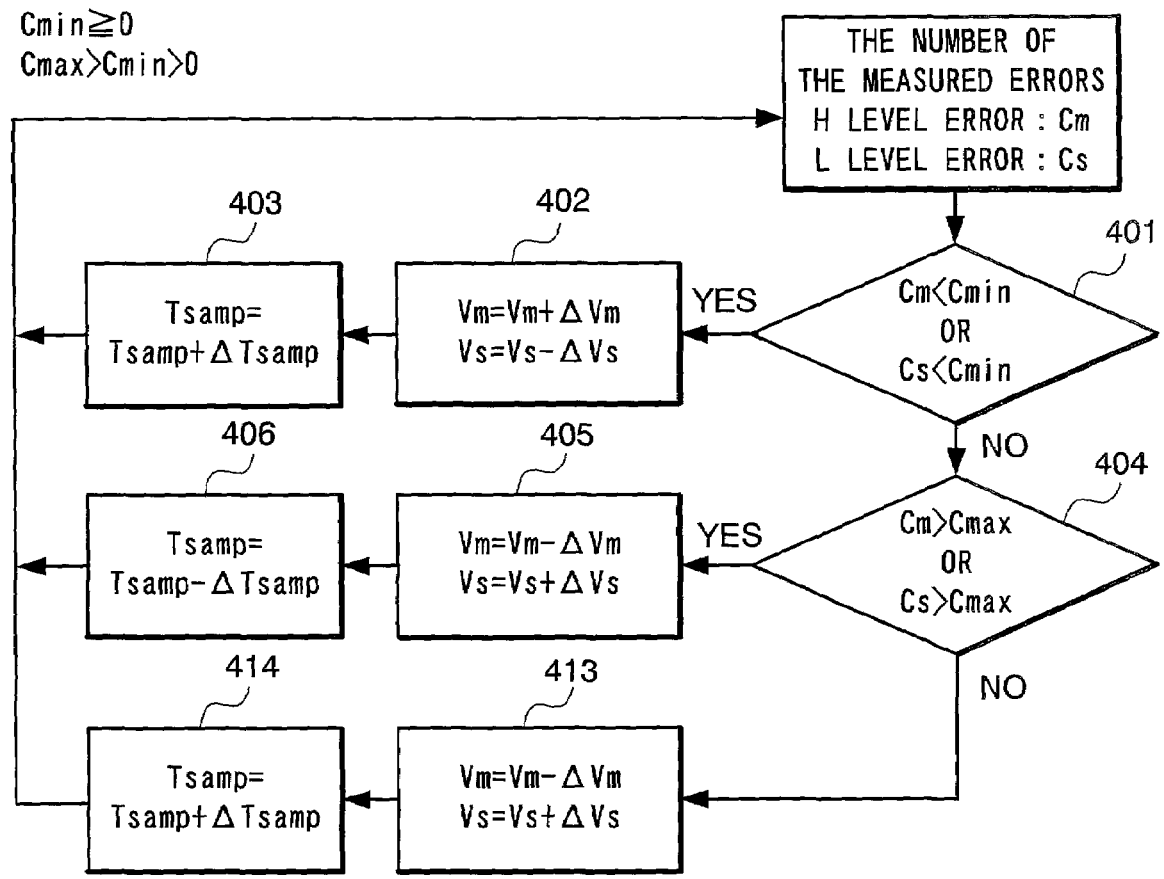
FIG. 12 is a flow chart for use in describing the operation of the decision threshold voltage control circuit according to the second embodiment of the present invention.

A second embodiment of the present invention will be described, this time. FIG. 10 is a view showing the structure of the decision threshold voltage control circuit according to the second embodiment of the present invention, FIG. 11 is a view showing the basic concept of a control algorithm according to the second embodiment, and FIG. 12 is one example of a flow chart by use of the control algorithm according to the second embodiment.

The second embodiment is formed by simplifying the first embodiment, and it omits the process of simultaneously moving the three decision points with the spaces between the central decision point voltage Vth and the respective upper and lower decision point voltages Vm and Vs kept as they are, from the first embodiment. The step of moving the upper decision point voltage Vm and the lower decision point voltage Vs and the step of changing the error measurement time Tsamp are the same as the corresponding steps of FIG. 5.

In the decision threshold voltage control circuit 10 according to the second embodiment, the central decision point voltage Vth is set at any point fixed between the upper decision point Vm and the lower decision point Vs by the processing unit 30. More specifically, after conversion into analog voltage, the central decision point voltage Vth is set at any point between the upper decision point voltage Vm and the lower decision point voltage Vs by using a voltage divider 60.

Figure 13:
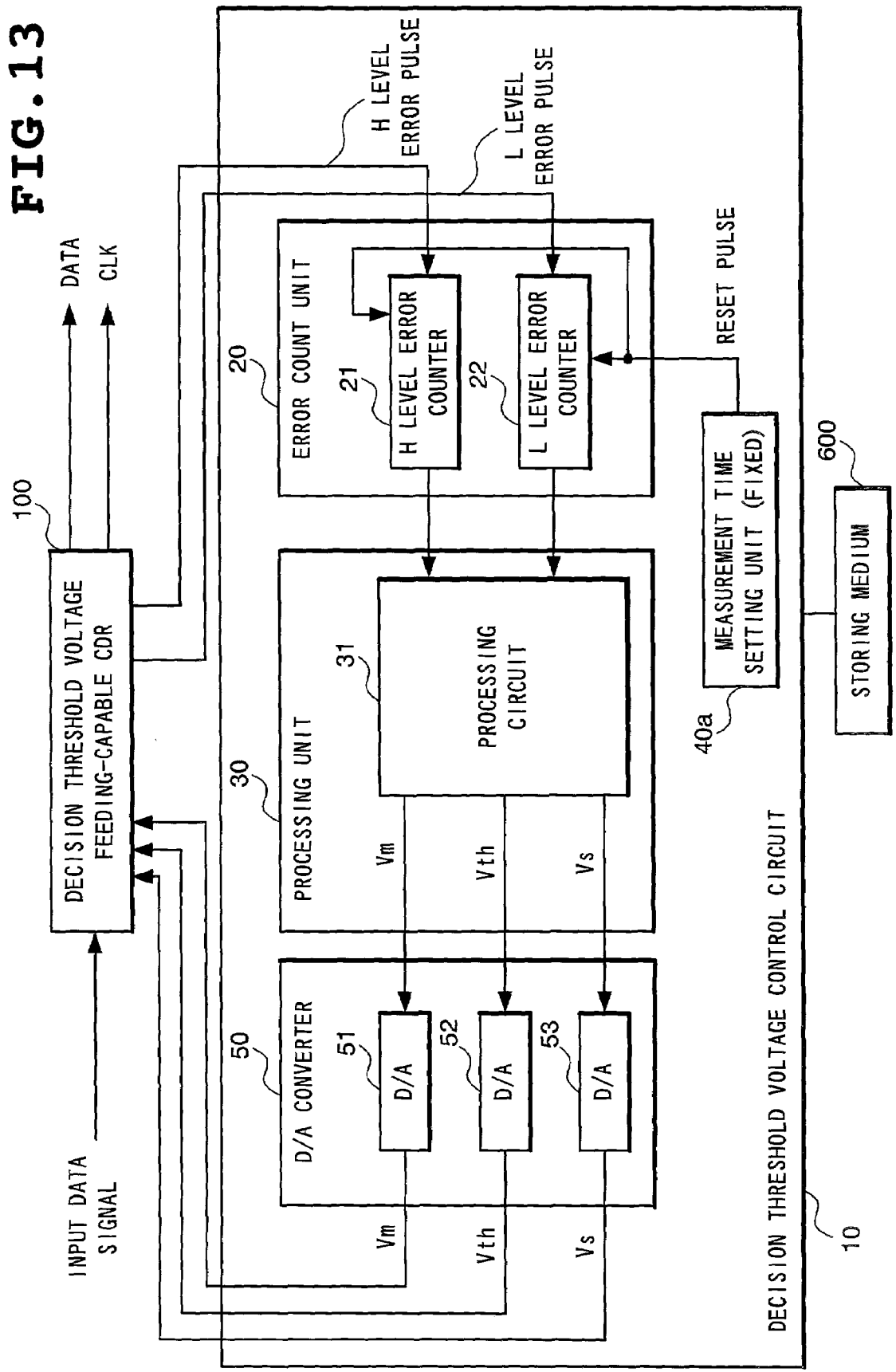
FIG. 13 is a block diagram showing the structure of the decision threshold voltage control circuit of a decision threshold voltage feeding-capable CDR according to the third embodiment of the present invention.
Figure 14:
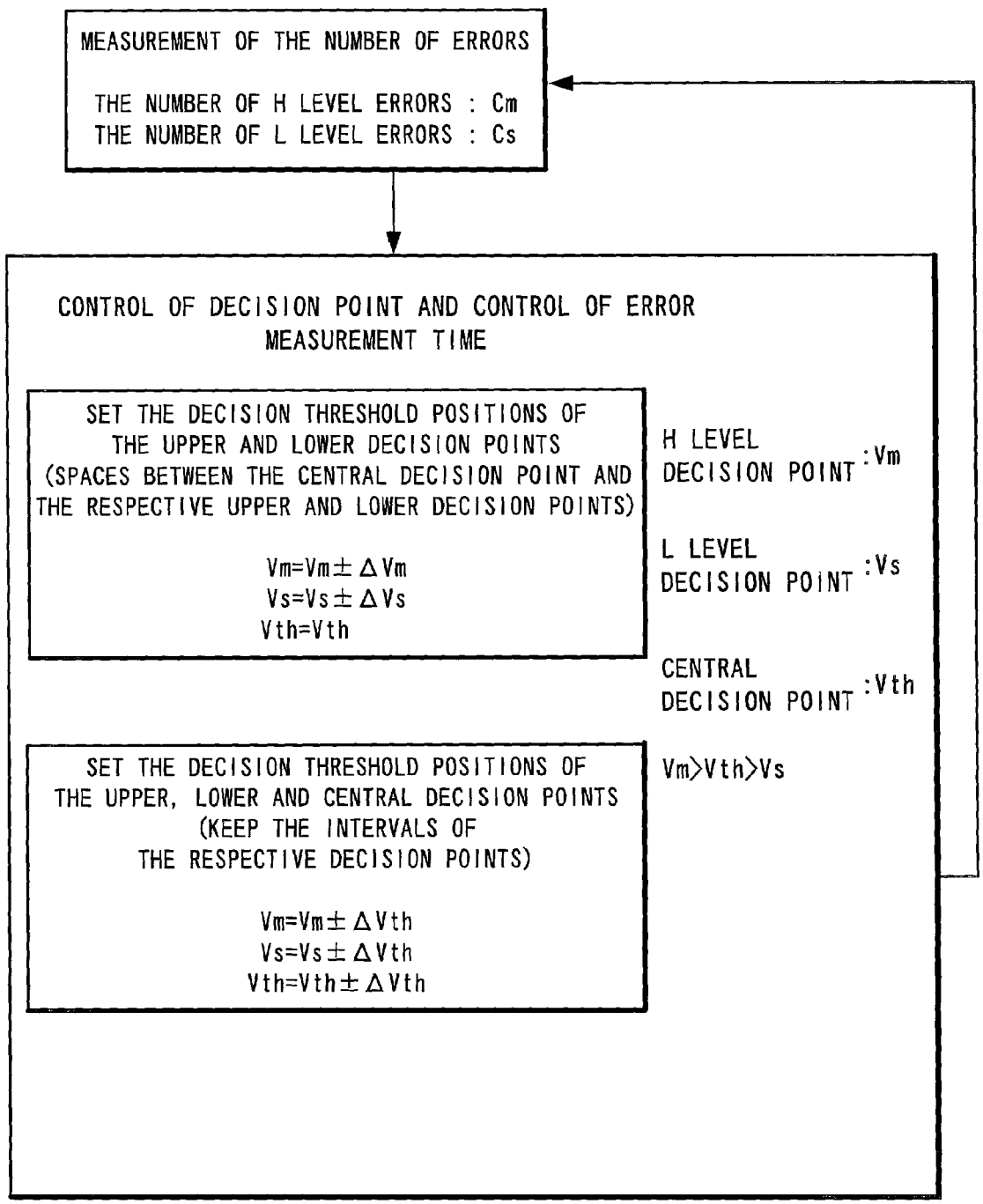
FIG. 14 is a view showing the basic concept of a control algorithm in a processing unit of the decision threshold voltage control circuit according to the third embodiment of the present invention.
Figure 15:
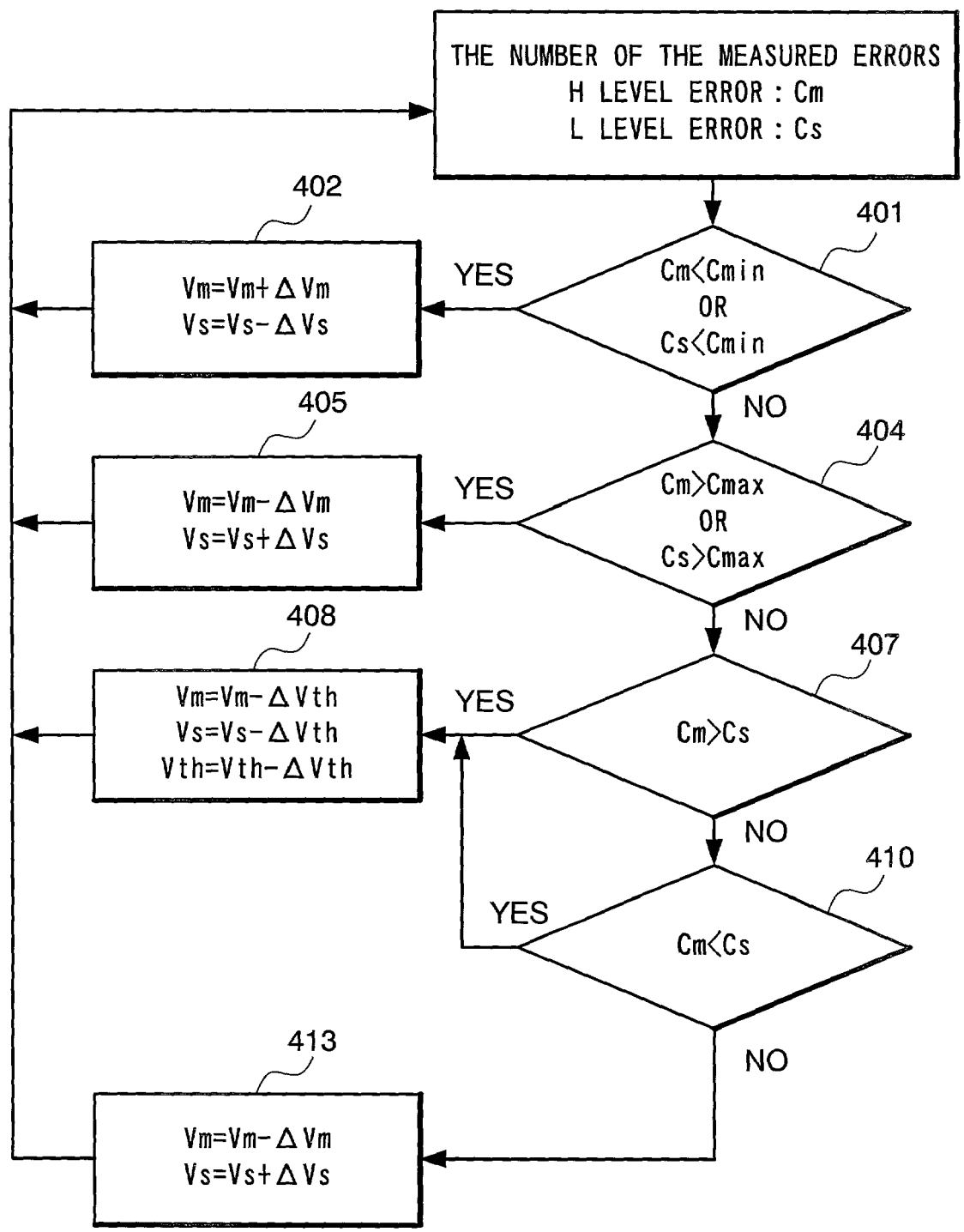
FIG. 15 is a flow chart for use in describing the operation of the decision threshold voltage control circuit according to the third embodiment of the present invention.

A third embodiment of the present invention will be described. FIG. 13 is a view showing the structure of the decision threshold voltage control circuit according to the third embodiment of the present invention, FIG. 14 a view showing the basic concept of a control algorithm according to the third embodiment, and FIG. 15 is one example of a flow chart using the control algorithm according to the third embodiment.

The third embodiment is constituted in that a fixed measurement time is set in the measurement time setting unit 40a, a count time is fixed in the error count unit 20, and that the error measurement time Tsamp is not changed, in the decision threshold voltage control circuit 10 according to the first embodiment.

Figure 16:
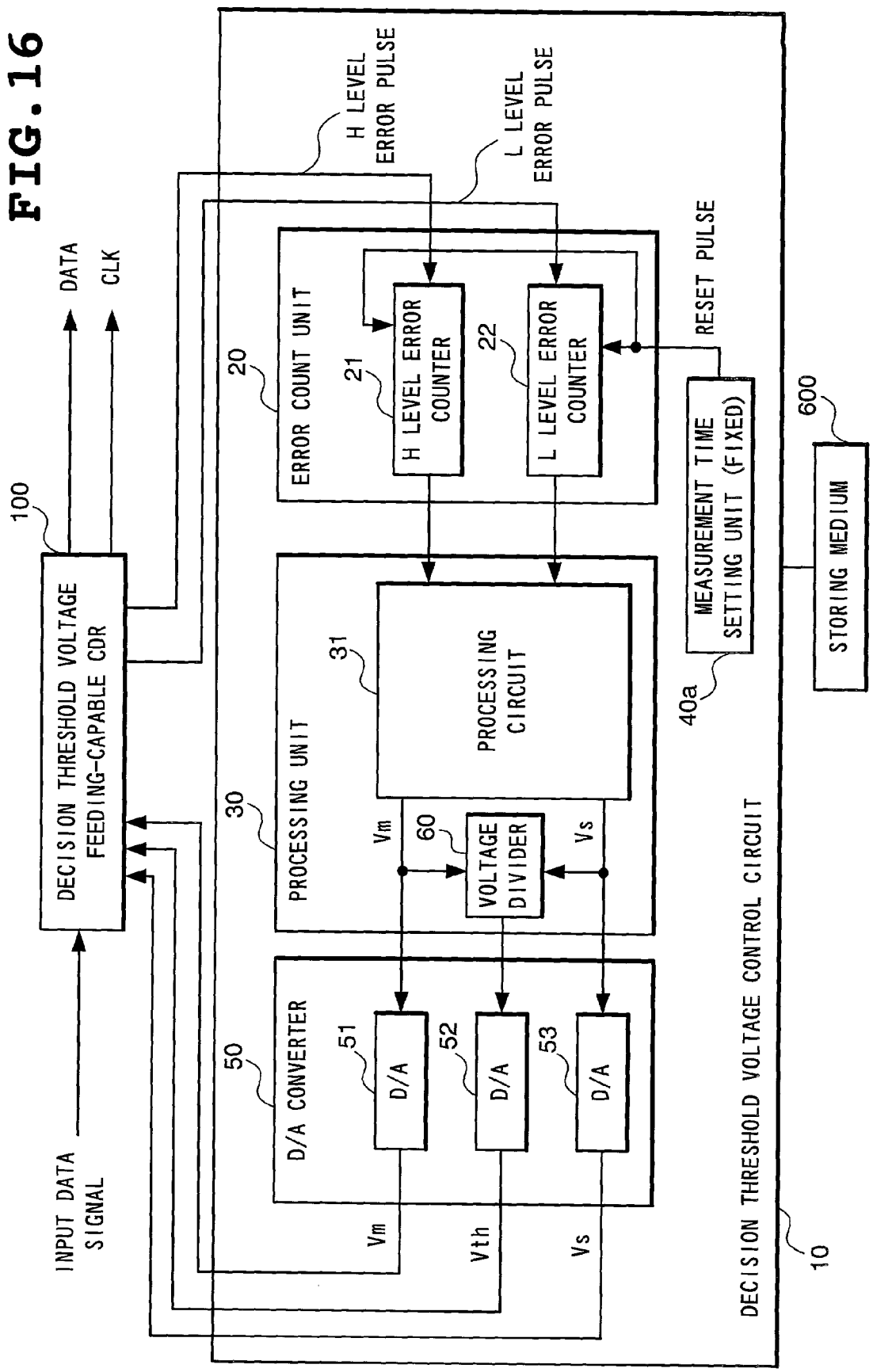
FIG. 16 is a block diagram showing the structure of the decision threshold voltage control circuit of a decision threshold voltage feeding-capable CDR according to the fourth embodiment of the present invention.
Figure 17:
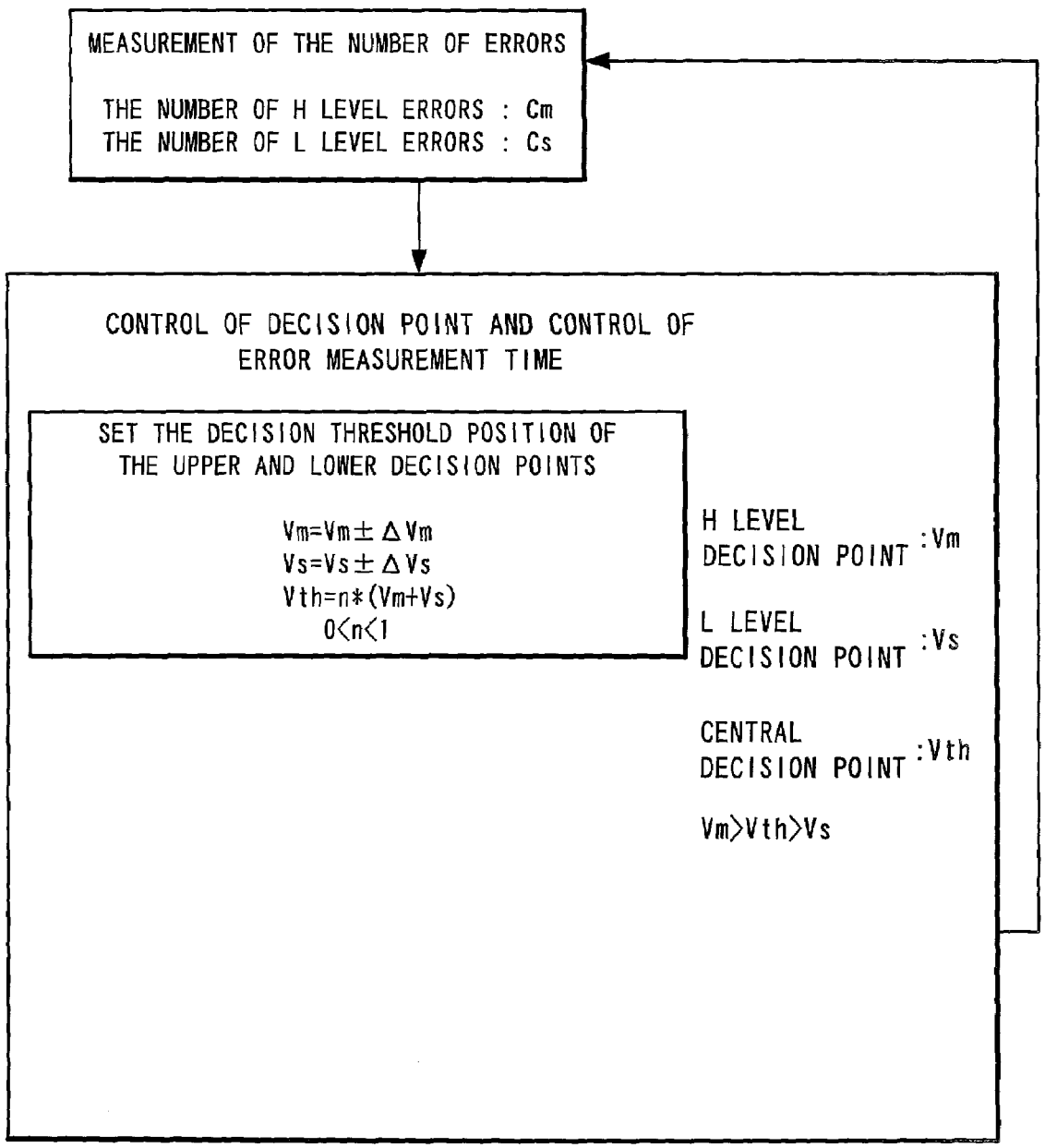
FIG. 17 is a view showing the basic concept of a control algorithm in a processing unit of the decision threshold voltage control circuit according to the fourth embodiment of the present invention.
Figure 18:
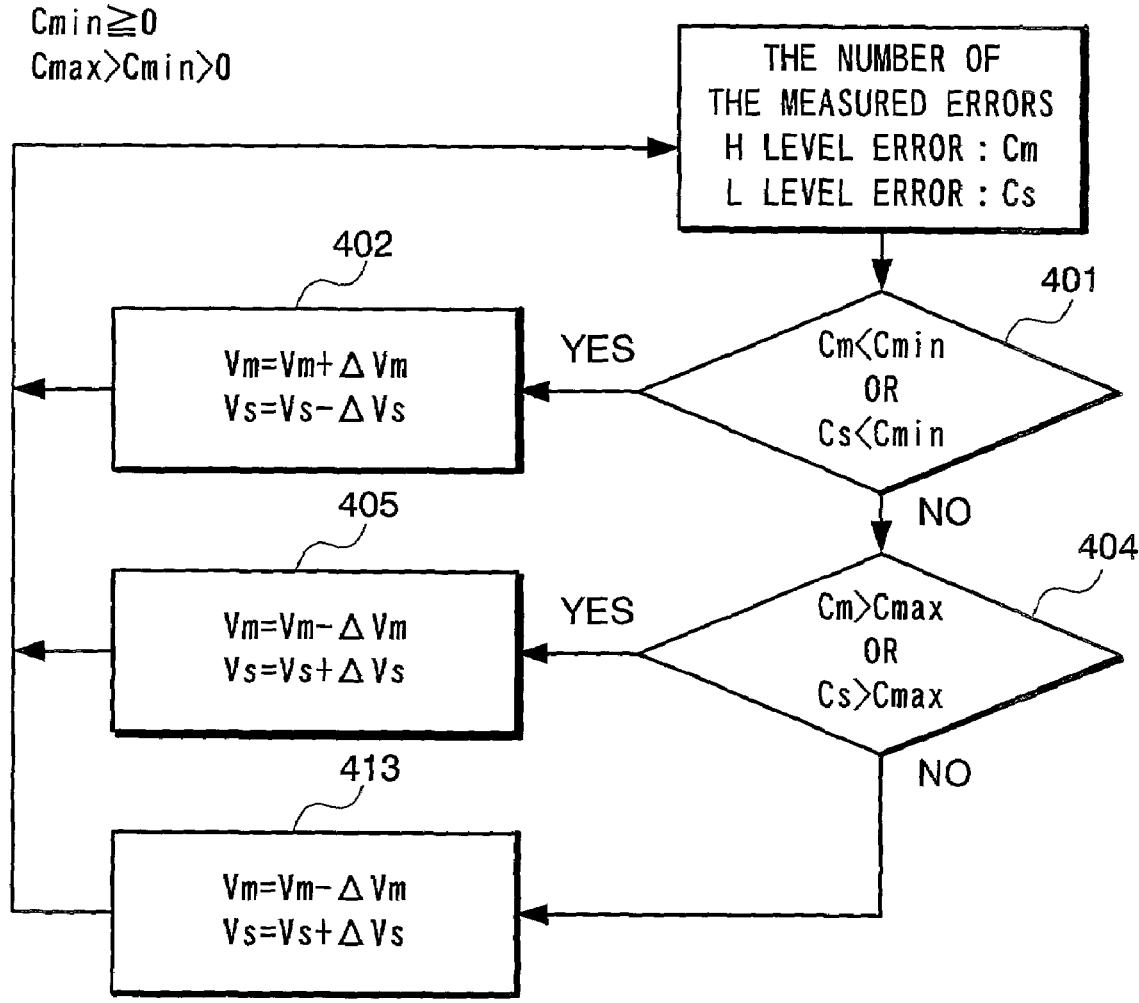
FIG. 18 is a flow chart for use in describing the operation of the decision threshold voltage control circuit according to the fourth embodiment of the present invention.
Figure 19:
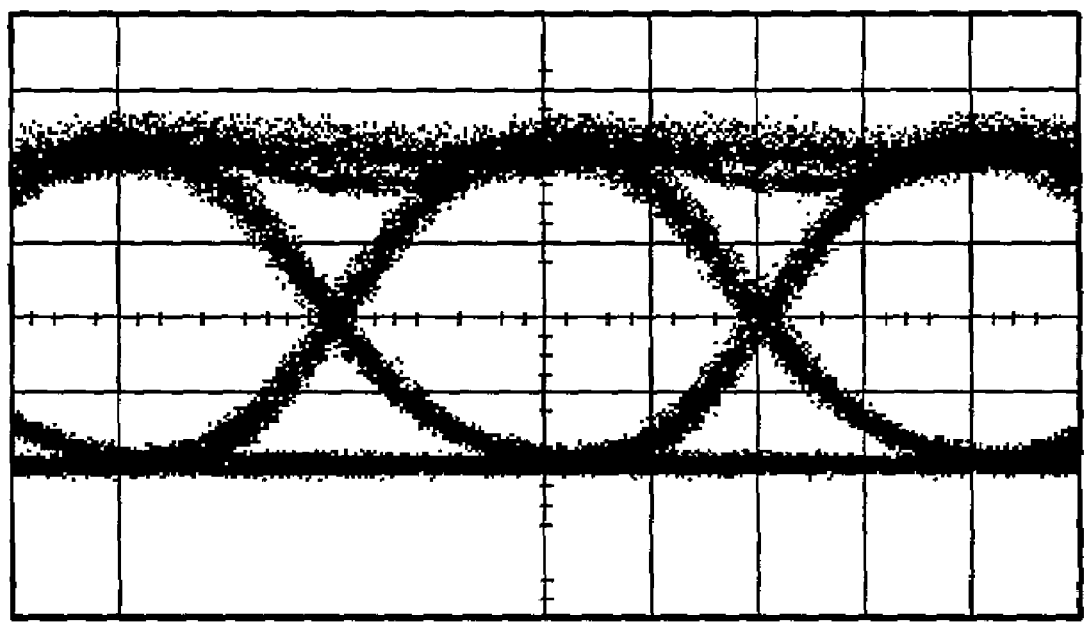
FIG. 19 is a view showing an example of the optical waveform after transmission.

A fourth embodiment of the present invention will be described. FIG. 16 is a view showing the structure of the decision threshold voltage control circuit according to the fourth embodiment of the present invention, FIG. 17 is a view showing the basic concept of a control algorithm according to the fourth embodiment, and FIG. 18 is one example of a flow chart using the control algorithm according to the fourth embodiment.

The fourth embodiment is constituted in that the count time is fixed in the error count unit 20 and that the error measurement time Tsamp is not changed, in addition to the structure of the decision threshold voltage control circuit 10 according to the second embodiment.

It is needless to say that the controls of the decision threshold voltage control circuit 10 according to the first to the fourth embodiments can be realized by forming each function of the control circuit by way of hardware. Further, they may be realized, by loading a decision threshold voltage control program that is a computer program having each function, into a memory of a computer. The decision threshold voltage control program is stored in a storing medium 600 such as a magnetic disk, a semiconductor memory, and the like. It is loaded from the storing medium into a computer, so to control the operation of the computer, thereby realizing each function of the above decision threshold voltage control circuit 10.

In the above-mentioned embodiments, the description has been made about the form of realizing the decision threshold voltage control circuit 10 by a digital circuit. The following fifth to seventh embodiments, however, indicate the form of realizing the decision threshold voltage control circuit having the same function by an analog circuit.

Figure 20:
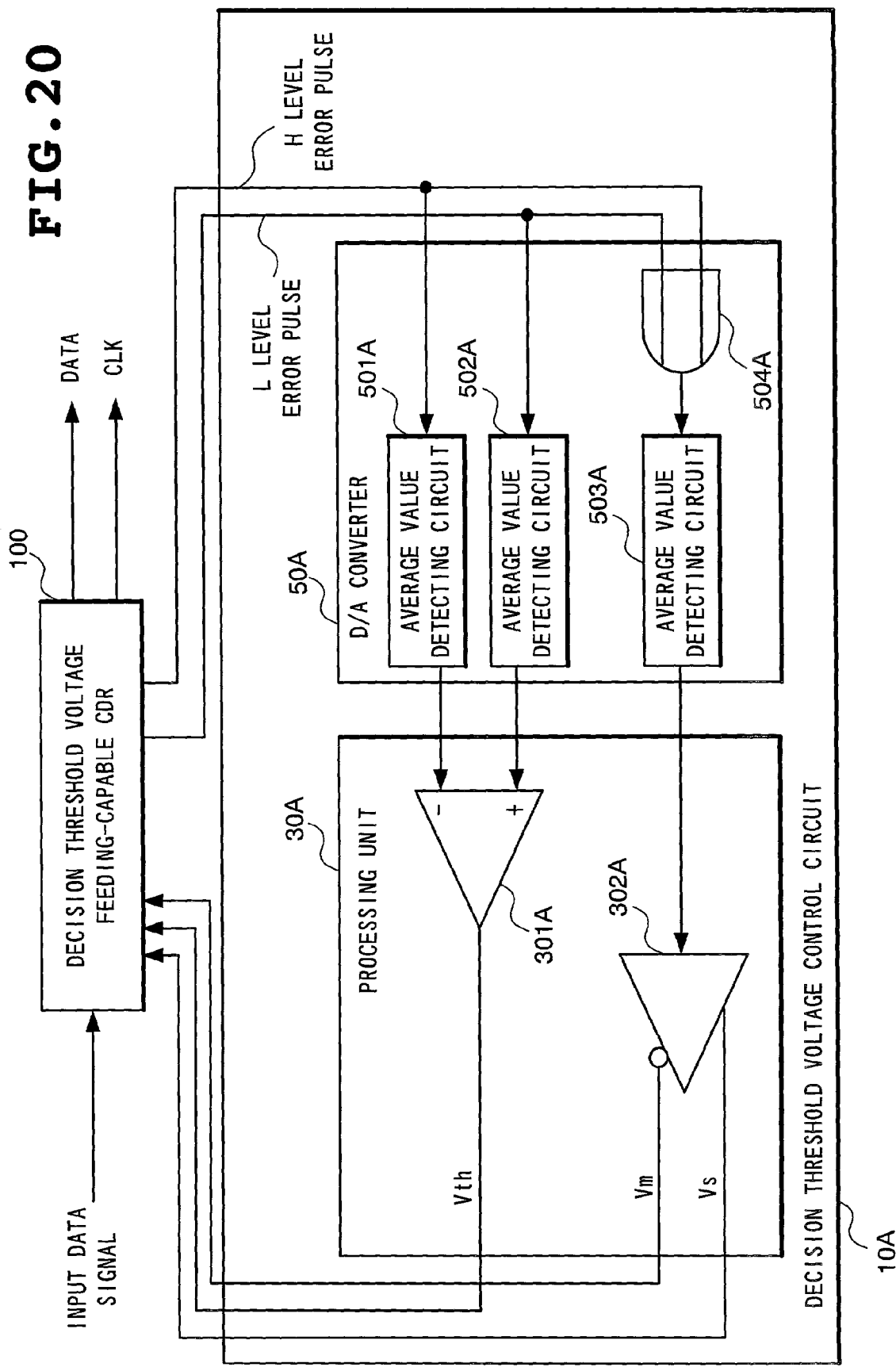
FIG. 20 is a block diagram showing the structure of an analog decision threshold voltage control circuit according to the fifth embodiment of the present invention.
Figure 21:
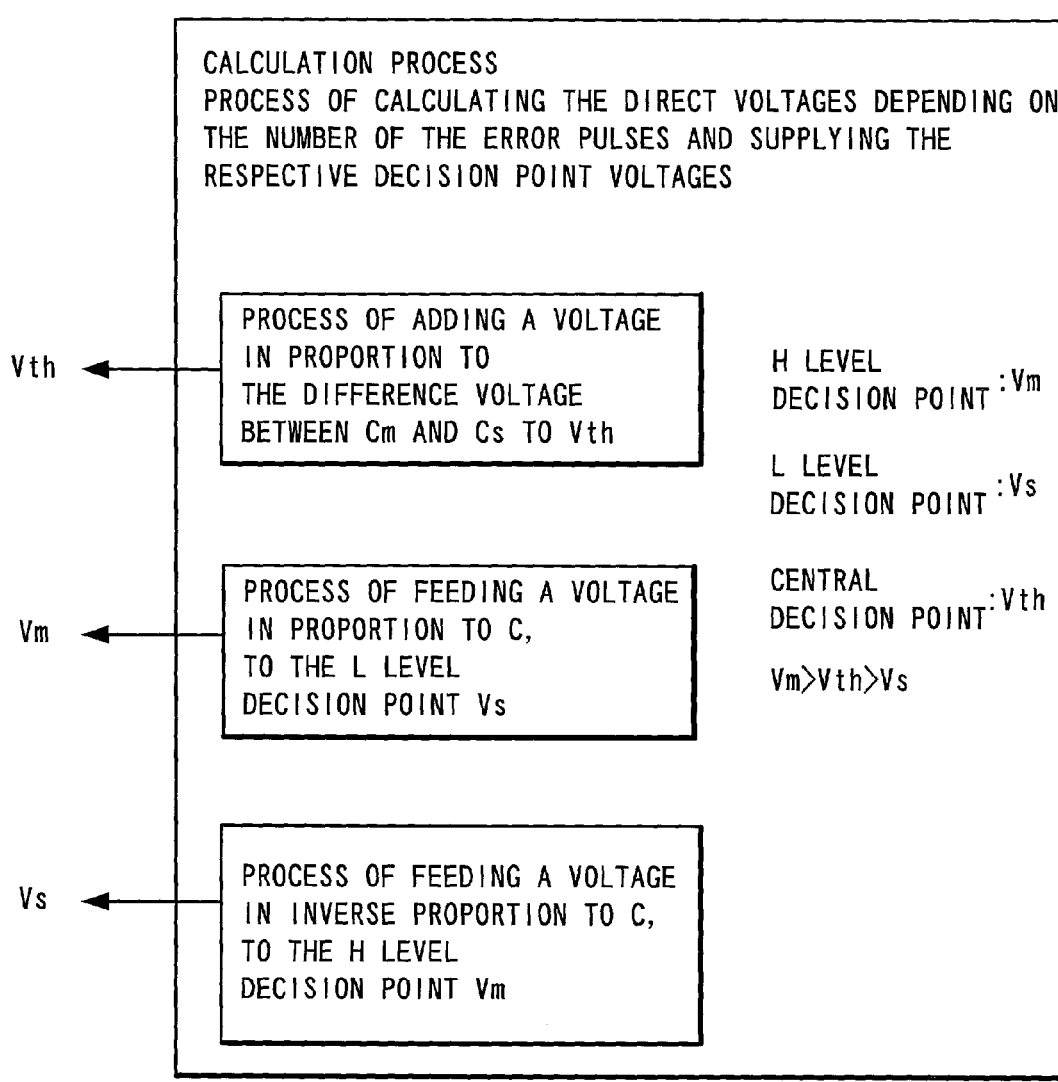
FIG. 21 is a view showing the basic concept of a control algorithm in a processing unit of the decision threshold voltage control circuit according to the fifth embodiment of the present invention.

At first, the fifth embodiment where the decision threshold voltage control circuit is realized by an analog circuit will be described. FIG. 20 is a view showing the structure of the decision threshold voltage control circuit according to the fifth embodiment of the present invention, and FIG. 21 is a view showing the basic concept of a control algorithm according to the fifth embodiment. In the fifth embodiment, the upper decision point voltage Vm, the lower decision point voltage Vs, the central decision point voltage Vth are controlled in an analog fashion so as to be positioned at the optimum intervals.

The decision threshold voltage control circuit 10A according to the fifth embodiment comprises a D/A converter 50A for converting the H level error pulses and the L level error pulses into the direct current voltages depending on the numbers of the respective level errors and a processing unit 30A. The processing unit 30A includes operational amplifiers 301A and 302A and the D/A converter 50A includes average value detecting circuits 501A to 503A and an OR-circuit 504A.

The operation of the decision threshold voltage control circuit 10A will be described with reference to FIG. 21. In the D/A converter 50A, the average value detecting circuit 501A converts the H level error pulses into the direct current voltages (H level error voltage Cm) depending on the number of the same error pulses, the average value detecting circuit 502A converts the L level error pulses into the direct current voltages (L level error voltage Cs) depending on the number of the same error pulses, and the average value detecting circuit 503A converts the logical OR of the H level and the L level error pulses into the direct current voltages (HL level error voltage C) depending on the number of the error pulses of the logical OR, and the above direct current voltages are supplied to the processing unit 30A.

In the processing unit 30A, the operational amplifier 301A determines a voltage in proportion to the difference voltage between the H level error voltage Cm and the L level error voltage Cs as the central decision point voltage Vth, and the operational amplifier 302A determines a voltage in inverse proportion to the HL level error voltage C as the upper decision point voltage Vm and a voltage in proportion to the HL level error voltage C as the lower decision point voltage Vs. The above processing is performed at once.

Namely, when the number of the H level errors>the number of the L level errors, the H level error voltage Cm>the L level error voltage Cs, the central decision point voltage Vth is lowered, and at the same time the HL level error voltage C occurs, thereby lowering the upper decision point voltage Vm and raising the lower decision point voltage Vs. As the result, each space between each decision point becomes narrower.

When it is desired to set a difference between the speed for extending the spaces and the speed for narrowing the spaces, in the space control of each decision point, a difference should be provided between the constant at charge and the constant at discharge in the process of converting the logical OR of the H level and the L level error pulses into the direct current voltages depending on the number of the same error pulses.

In the fifth embodiment, depending on the measurement result of the number of the H level and the L level errors, the spaces of the three decision points; the upper decision point voltage Vm, the lower decision point voltage Vs, and the central decision point voltage Vth are controlled, thereby making it possible to adjust the respective decision points at the optimum positions.

Figure 22:
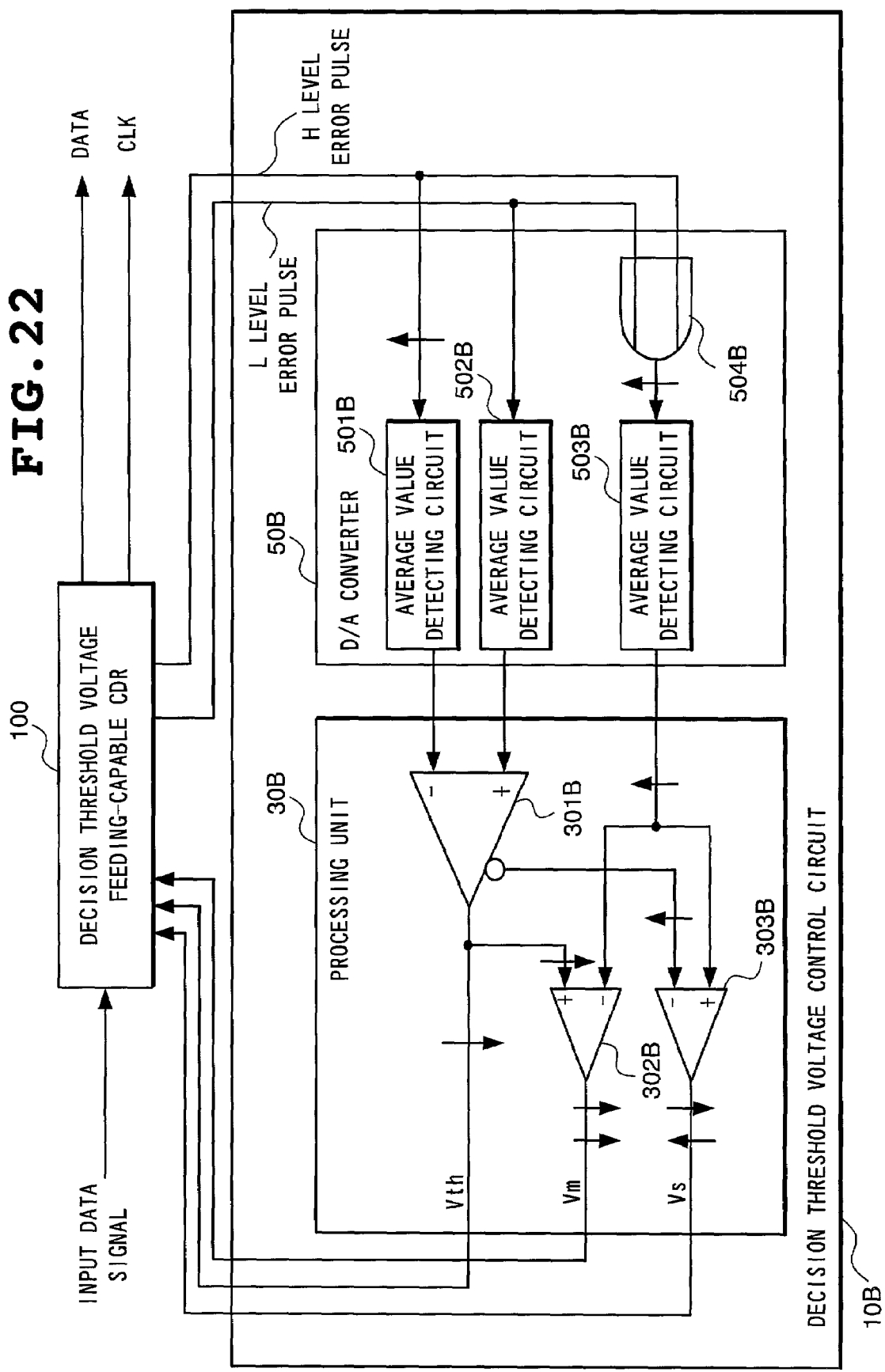
FIG. 22 is a block diagram showing the structure of an analog decision threshold voltage control circuit according to the sixth embodiment of the present invention.

The sixth embodiment in which the decision threshold voltage control circuit is realized by an analog circuit will be described. FIG. 22 is a view showing the structure of the decision threshold voltage control circuit according to the sixth embodiment of the present invention. In the sixth embodiment, the spaces between the respective upper and lower decision point voltages Vm and Vs and the central decision point voltage Vth are controlled and the three decision points are moved with their spaces kept as they are, hence to control the respective decision points to be placed at the optimum positions in an analog fashion.

The decision threshold voltage control circuit 10B according to the sixth embodiment includes a D/A converter 50B for converting the H level error pulses and the L level error pulses into the direct current voltages depending on the numbers of the respective level errors and a processing unit 30B. The processing unit 30B includes operational amplifiers 301B, 302B, and 303B, and the D/A converter 50A includes average value detecting circuits 501B to 503B and an OR circuit 504B. The structure other than the processing unit 30B is the same as that of the fifth embodiment.

In the processing unit 30B, the operational amplifier 301B determines a voltage in proportion to the difference voltage between the H level error voltage Cm and the L level error voltage Cs as the central decision point voltage Vth, the operational amplifier 302B determines a voltage in proportion to the difference voltage between the HL level error voltage C and the central decision point voltage Vth as the upper decision point voltage Vm, and the operational amplifier 303B determines a voltage in proportion to the difference voltage between the HL level error voltage C and the voltage in inverse proportion to the difference voltage between the H level error voltage Cm and the L level error voltage Cs as the lower decision point voltage Vs.

In the above structure, when the central decision point voltage Vth varies upward and downward, the upper decision point voltage Vm and the lower decision point voltage Vs also vary upward and downward accordingly. In the sixth embodiment, depending on the measurement result of the number of the H level errors and the L level errors, the spaces of the three decision points; the upper decision point voltage Vm, the lower decision point voltage Vs, and the central decision point voltage Vth are thus controlled and the three decision points are controlled to move while keeping the spaces thereof, thereby making it possible to adjust the decision points at the optimum positions.

Figure 23:
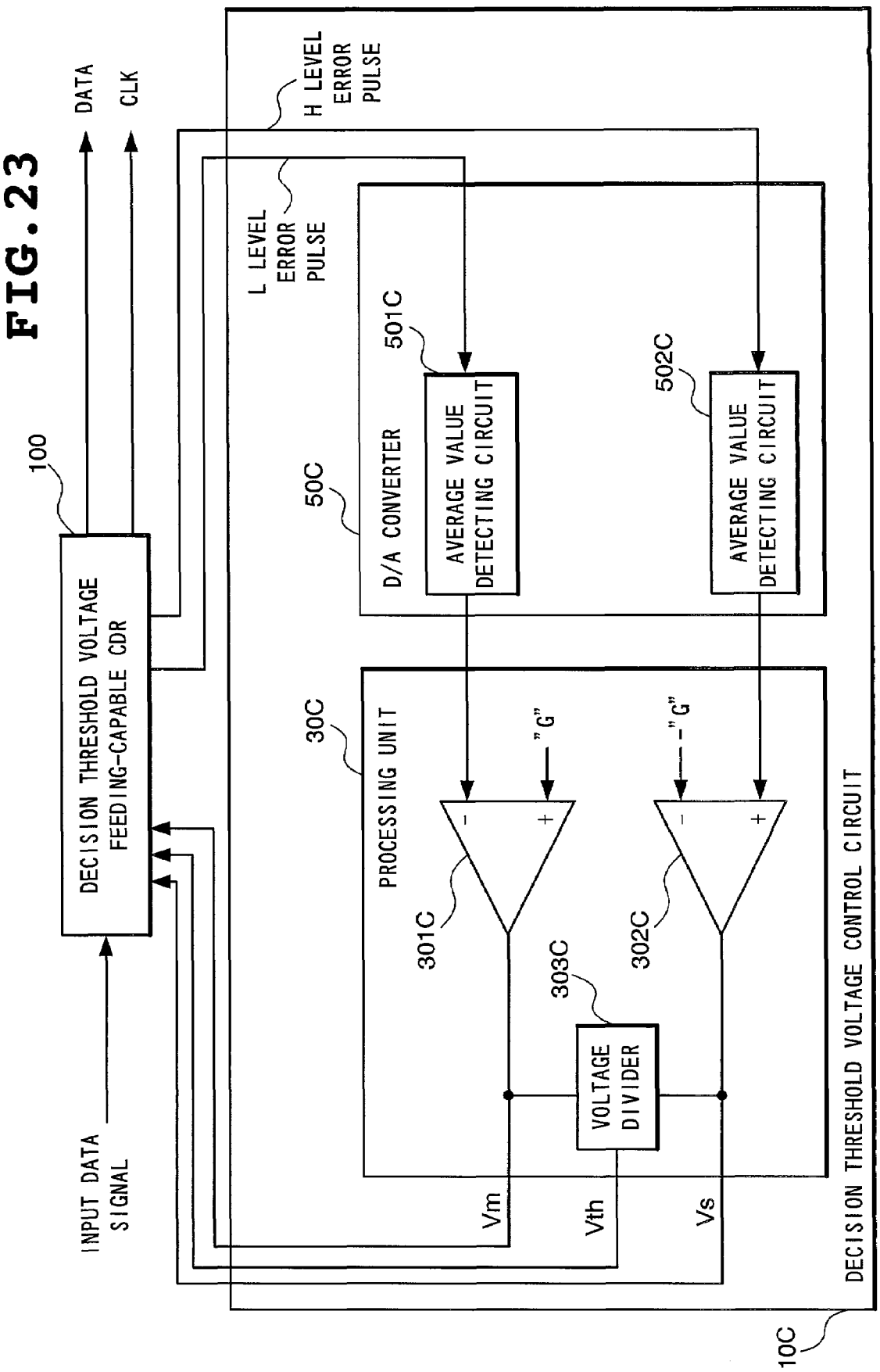
FIG. 23 is a block diagram showing the structure of an analog decision threshold voltage control circuit according to the seventh embodiment of the present invention.
Figure 24:
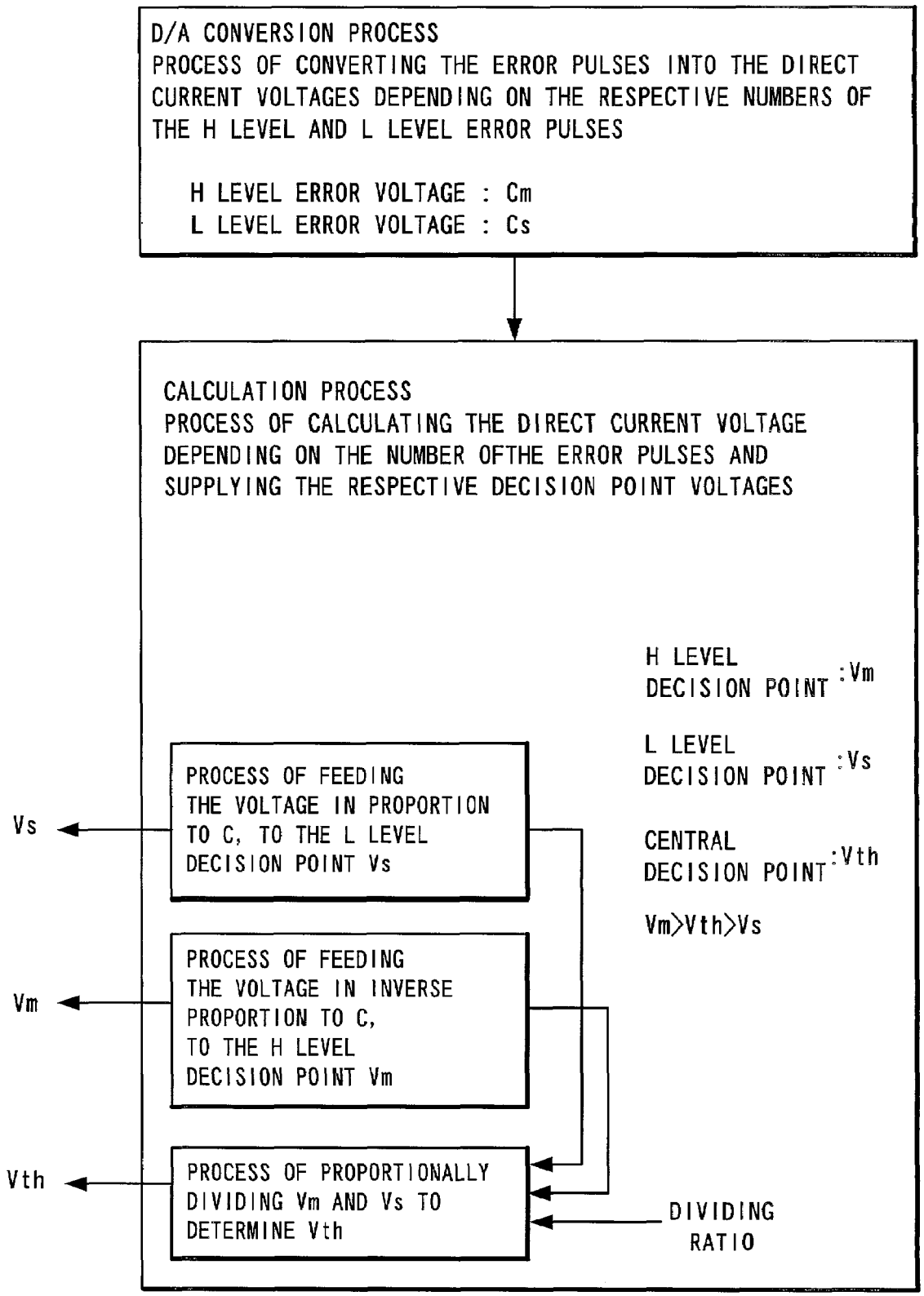
FIG. 24 is a view showing the basic concept of a control algorithm in a processing unit of the decision threshold voltage control circuit according to the seventh embodiment of the present invention.
Figure 25:
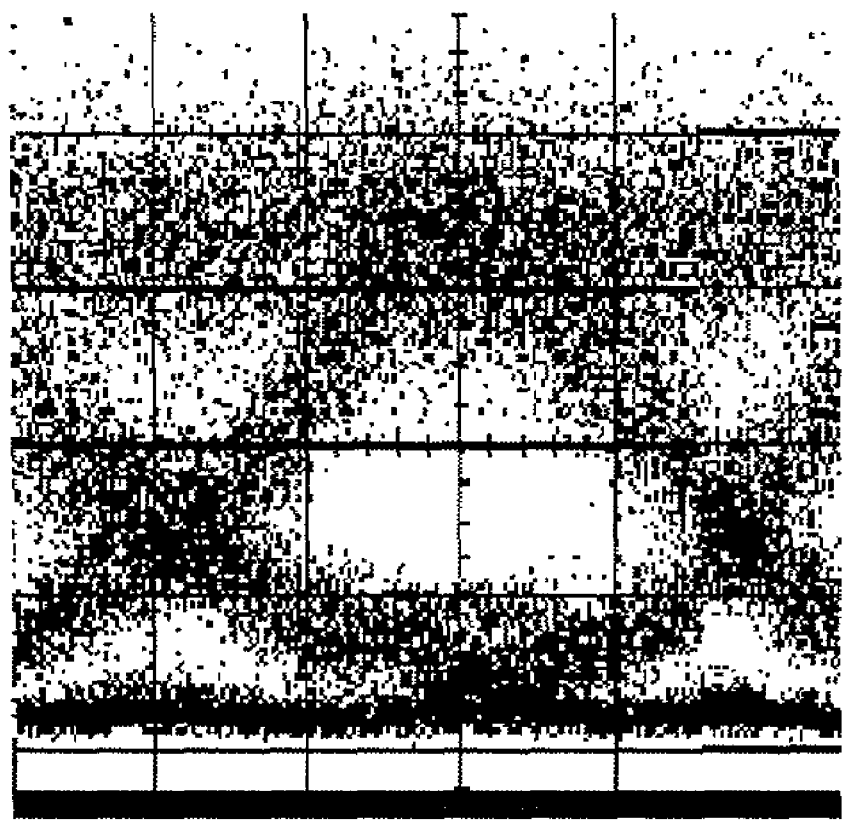
FIG. 25 is a view showing an example of the optical waveform after transmission.

At last, the seventh embodiment in which the decision threshold voltage control circuit is realized by an analog circuit will be described. FIG. 23 is a view showing the structure of the decision threshold voltage control circuit according to the seventh embodiment of the present invention, and FIG. 24 is a view showing the basic concept of a control algorithm according to the seventh embodiment. In the seventh embodiment, the upper decision point voltage Vm, the lower decision point voltage Vs, and the central decision point voltage Vth are controlled to be placed at the optimum intervals in an analog fashion.

The decision threshold voltage control circuit 10C according to the seventh embodiment comprises a D/A converter 50C for converting the H level error pulses and the L level error pulses into the direct current voltages depending on the numbers of the respective level errors, and a processing unit 30C. The processing unit 30C includes operational amplifiers 301C and 302C and a voltage divider 303C, and the D/A converter 50A includes average value detecting circuits 501C and 502C.

The decision threshold voltage control circuit 10C only controls the space between the upper decision point voltage Vm and the lower decision point voltage Vs, and determines the central decision point voltage Vth through proportional distribution of the upper decision point voltage Vm and the lower decision point voltage Vs by the voltage divider 303C. The dividing ratio of the voltage divider 303C can be set at any value.

According to the seventh embodiment, when the H level error voltage Cm occurs, the upper decision point voltage Vm is controlled to be lowered, and when the L level error voltage Cs occurs, the lower decision point voltage Vs is controlled to be raised. Thus, the upper decision point voltage Vm, the lower decision point voltage Vs, and the central decision point voltage Vth are controlled to be placed at the optimum intervals.

Also in the fifth to the seventh embodiments, the measurement time may be set, depending on the power of the H level error voltage Cm and the L level error voltage Cs, similarly to the first embodiment.

As mentioned above, although the present invention has been described by taking preferred embodiments for example, the present invention is not restricted to the above-mentioned embodiments, but it can be modified within the range of the technical sprit.

As set forth hereinabove, the decision threshold voltage control circuit of the decision threshold voltage feeding-capable CDR and the decision threshold voltage control method of the present invention can achieve the following effects.

At first, since the decision threshold position can be controlled at the optimum at each light receiving level, the present invention can improve the error rate characteristic better than the conventional decision circuit in which the decision point is fixed, and it can prevent from floor.

At second, since the inner margin of the eye opening is detected, it can control the decision point Vth at the optimum position.

At third, since the measurement time is adjusted depending on the measurement result of the error count unit, it can enhance the measurement accuracy and escape from a bad state quickly.

At fourth, since the measurement time is changed depending on the number of the measured errors, it is not necessary to use a large-sized counter uselessly.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising:

controlling three decision points suitably, by selectively performing, depending on a measurement result of an error pulse, a process of changing differences between the three decision points, a process of moving the three decision points with their differences kept as they are, or a process of changing an error pulse measurement time, the error pulse measurement time being a time period over which error pulses are counted, wherein the process of changing differences between the three decision points is performed upon a first measurement result of the error pulse, the process of moving the three decision points with their differences kept as they are is performed upon a second measurement result of the error pulse, and the process of changing an error pulse measurement time is performed upon a third measurement result of the error pulse.

2. A decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising:

controlling three decision points suitably, depending on a measurement result of an error pulse, by selectively performing a process of changing differences between the three decision points, or a process of changing an error pulse measurement time, the error pulse measurement time being a time period over which error pulses are counted, wherein the process of changing differences between the three decision points is performed upon a first measurement result of the error pulse, and the process of changing an error pulse measurement time is performed upon a third measurement result of the error pulse notwithstanding a second measurement result of the error pulse.

3. A decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising:

counting a number of errors at an H level and a number of errors at an L level based on comparing the input data signal with the H level and the L level; and changing a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level.

4. A decision threshold voltage controlling method to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the method comprising:

counting a number of errors at an H level and a number of errors at an L level based on comparing the input data signal with the H level and the L level;

changing a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level; and setting the central decision point at an optimum position while detecting an inner margin of an eye opening of the input data signal.

5. The decision threshold voltage controlling method, as set forth in claim 4, further comprising:

moving the three decision points simultaneously, with the differences between the respective upper and lower decision points and the central decision point kept as they are, depending on the measurement result of the errors.

6. The decision threshold voltage controlling method, as set forth in claim 4, further comprising:

changing a time of measuring the number of the errors, depending on the measurement result of the errors.

7. The decision threshold voltage controlling method, as set forth in claim 4, further comprising:

moving the three decision points simultaneously, with the differences between the respective upper and lower decision points and the central decision point kept as they are, depending on the measurement result of the errors; and changing a time of measuring the number of the errors, depending on the measurement result of the errors.

8. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:

means for controlling three decision points suitably, depending on a measurement result of an error pulse, by selectively performing a process of changing differences between the three decision points, a process of moving the three decision points with their differences kept as they are, or a process of changing an error pulse measurement time, the error pulse measurement time being a time period over which error pulses are counted, wherein the process of changing differences between the three decision points is performed upon a first measurement result of the error pulse, the process of moving the three decision points with their differences kept as they are is performed upon a second measurement result of the error pulse, and the process of changing an error pulse measurement time is performed upon a third measurement result of the error pulse.

9. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:

means for controlling three decision points suitably, depending on a measurement result of an error pulse, by selectively performing a process of changing differences between the three decision points, or a process of changing an error pulse measurement time, the error pulse measurement time being a time period over which error pulses are counted, wherein the process of changing differences between the three decision points is performed upon a first measurement result of the error pulse, and the process of changing an error pulse measurement time is performed upon a third measurement result of the error pulse notwithstanding a second measurement result of the error pulse.

10. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:

an error count unit which counts the number of errors at an H level and a number of errors at an L level based on comparing the input data signal with the H level and the L level; and a processing unit which changes a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level.

11. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:
  an error count unit which counts the number of errors at an H level and a number of errors at an L level based on comparing the input data signal with the H level and the L level; and
  a processing unit which changes a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level, wherein
  the central decision point is set at an optimum position while detecting an inner margin of an eye opening of the input data signal.

12. The decision threshold voltage control circuit, as set forth in claim 11, wherein
  further said processing unit moves the three decision points simultaneously, with the differences between the respective upper and lower decision points and the central decision point kept as they are, depending on the measurement result of the errors.

13. The decision threshold voltage control circuit, as set forth in claim 11, wherein
  further said processing unit
  changes a time of measuring the number of the errors, depending on the measurement result of the errors.

14. The decision threshold voltage control circuit, as set forth in claim 11, wherein
  further said processing unit
  moves the three decision points simultaneously, with the differences between the respective upper and lower decision points and the central decision point kept as they are, depending on the measurement result of the errors; and
  changes a time of measuring the number of the errors, depending on the measurement result of the errors.

15. A decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:
  a decision threshold voltage control circuit which controls three decision points suitably, by selectively performing, depending on a measurement result of an error pulse, a process of changing differences between the three decision points, a process of moving the three decision points with their differences kept as they are, or a process of changing an error pulse measurement time, the error pulse measurement time being a time period over which error pulses are counted, wherein the process of changing differences between the three decision points is performed upon a first measurement result of the error pulse, the process of moving the three decision points with their differences kept as they are is performed upon a second measurement result of the error pulse and the process of changing an error pulse measurement time is performed upon a third measurement result of the error pulse.

16. A decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:
  a decision threshold voltage control circuit which controls three decision points suitably, by selectively performing, depending on a measurement result of an error pulse, a process of changing differences between the three decision points, or a process of changing an error pulse measurement time, the error pulse measurement time being a time period over which error pulses are counted, wherein the process of changing differences between the three decision points is performed upon a first measurement result of the error pulse, and the process of changing an error pulse measurement time is performed upon a third measurement result of the error pulse notwithstanding a second measurement result of the error pulse.

17. A decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:
  an error count unit which counts the number of errors at an H level and the number of errors at an L level of the input data signal; and
  a processing unit which changes a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level.

18. A decision threshold voltage feeding-capable clock and data recovery circuit where a function of feeding a decision threshold voltage is added to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:
  an error count unit which counts the number of errors at an H level and the number of errors at an L level of the input data signal;
  a processing unit which changes a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level; and a decision threshold voltage control circuit which sets the central decision point at an optimum position while detecting an inner margin of an eye opening of the input data signal.

19. The decision threshold voltage feeding-capable clock and data recovery circuit, as set forth in claim 18, wherein said processing unit moves the three decision points simultaneously, with the differences between the respective upper and lower decision points and the central decision point kept as they are, depending on the measurement result of the errors.

20. The decision threshold voltage feeding-capable clock and data recovery circuit, as set forth in claim 18, wherein said processing unit changes a time of measuring the number of the errors, depending on the measurement result of the errors.

21. The decision threshold voltage feeding-capable clock and data recovery circuit, as set forth in claim 18, wherein said processing unit moves the three decision points simultaneously, with the differences between the respective upper and lower decision points and the central decision point kept as they are, depending on the measurement result of the errors; and changes a time of measuring the number of the errors, depending on the measurement result of the errors.

22. A decision threshold voltage control program to feed an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the program comprising:

a function of counting a number of errors at an H level and a number of errors at an L level based on comparing the input data signal with the H level and the L level; and a function of changing a difference between an upper decision point at the H level and a central decision point, or a difference between a lower decision point at the L level and the central decision point, wherein each of the differences and each of the upper decision point and lower decision point depends on both the measurement result of the number of errors at the H level and the number of errors at the L level, wherein the central decision point is set at an optimum position while detecting an inner margin of an eye opening of the input data signal.

23. The decision threshold voltage control program, as set forth in claim 22, further comprising:

a function of moving the three decision points simultaneously, with the differences between the respective upper and lower decision points and the central decision point kept as they are, depending on the measurement result of the errors.

24. The decision threshold voltage control program, as set forth in claim 22, further comprising:

a function of changing a time of measuring the number of the errors, depending on the measurement result of the errors.

25. The decision threshold voltage control program, as set forth in claim 22, further comprising:

a function of moving the three decision points simultaneously, with the differences between the respective upper and lower decision points and the central decision point kept as they are, depending on the measurement result of the errors; and a function of changing a time of measuring the number of the errors, depending on the measurement result of the errors.

26. An optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprising:

a decision threshold voltage control circuit which controls three decision points suitably, by selectively performing, depending on a measurement result of an error pulse, a process of changing differences between the three decision points, a process of moving the three decision points with their differences kept as they are, or a process of changing an error pulse measurement time, the error pulse measurement time being a time period over which error pulses are counted, wherein the process of changing differences between the three decision points is performed upon a first measurement result of the error pulse, the process of moving the three decision points with their differences kept as they are is performed upon a second measurement result of the error pulse, and the process of changing an error pulse measurement time is performed upon a third measurement result of the error pulse.

27. An optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprising:

a decision threshold voltage control circuit which controls three decision points suitably, by selectively performing, depending on a measurement result of an error pulse, a process of changing differences between the three decision points, or a process of changing an error pulse measurement time, the error pulse measurement time being a time period over which error pulses are counted, wherein the process of changing differences between the three decision points is performed upon a first measurement result of the error pulse, and the process of changing an error pulse measurement time is performed upon a third measurement result of the error pulse notwithstanding a second measurement result of the error pulse.

28. An optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprising:

an error count unit which counts a number of errors at an H level and a number of errors at an L level of the input data signal; and a processing unit which changes a difference between an upper decision point at the H level and a central decision point, or a space between a lower decision point at the L level and the central decision point, wherein each of the differences and each of the upper decision point and lower decision point depends on both the measurement result of the number of errors at the H level and the number of errors at the L level.

29. An optical receiver having an optical-to-electric converter of converting an optical input signal into an electric signal to supply it as an input data signal and a decision threshold voltage feeding-capable clock and data recovery circuit where a function of feeding a decision threshold voltage is added to a clock and data recovery circuit of extracting a clock component from the input data signal amplified with a predetermined amplitude and identifying 1 or 0 of the input data signal at a timing of the clock, the optical receiver comprising:

an error count unit which counts a number of errors at an H level and a number of errors at an L level of the input data signal;

a processing unit which changes a difference between an upper decision point at the H level and a central decision point, or a space between a lower decision point at the L level and the central decision point, wherein each of the differences and each of the upper decision point and lower decision point depends on both the measurement result of the number of errors at the H level and the number of errors at the L level; and a decision threshold voltage control circuit which sets the central decision point at an optimum position while detecting an inner margin of an eye opening of the input data signal.

30. The optical receiver, as set forth in claim 29, wherein said processing unit moves the three decision points simultaneously, with the differences between the respective upper and lower decision points and the central decision point kept as they are, depending on the measurement result of the errors.

31. The optical receiver, as set forth in claim 29, wherein said processing unit changes a time of measuring the number of the errors, depending on the measurement result of the errors.

32. The optical receiver, as set forth in claim 29, wherein said processing unit moves the three decision points simultaneously, with the differences between the respective upper and lower decision points and the central decision point kept as they are, depending on the measurement result of the errors; and changes a time of measuring the number of the errors, depending on the measurement result of the errors.

33. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:

a D/A converter which generates a voltage depending on a number of errors at an H level and a number of errors at an L level of the input data signal; and a processing unit which changes a difference between an upper decision point at the H level and a central decision point, or a difference between a lower decision point at the L level and the central decision point, according to a voltage, wherein each of the differences and each of the upper decision point and lower decision point depends on both the number of the errors at the H level and the number of errors at the L level, wherein the central decision point is set at an optimum position while detecting an inner margin of an eye opening of the input data signal.

34. The decision threshold voltage control circuit, as set forth in claim 33, wherein said processing unit further includes a first operational amplifier which determines a voltage in proportion to a difference voltage between a voltage corresponding to the number of the H level errors and a voltage corresponding to the number of the L level errors as a voltage corresponding to the central decision point, and a second operational amplifier which determines a voltage in inverse proportion to a voltage corresponding to a number of HL level errors as a voltage corresponding to the upper decision point and a voltage in proportion to the voltage corresponding to the number of the HL level errors as a voltage corresponding to the lower decision point.

35. The decision threshold voltage control circuit, as set forth in claim 33, wherein said processing unit includes a voltage divider which divides the voltage corresponding to the upper decision point at the H level and the voltage corresponding to the lower decision point at the L level by some dividing ratio so as to supply a voltage corresponding to the central decision point.

36. A decision threshold voltage control circuit for feeding an optimum decision threshold voltage to a clock and data recovery circuit which inputs an electric signal converted from an optical input signal and amplified with a predetermined amplitude as an input data signal, extracts a clock frequency component from the input data signal, and identifies 1 or 0 in the input data signal at a timing of the clock, the circuit comprising:

a D/A converter which generates a voltage depending on a number of errors at an H level and a number of errors at an L level of the input data signal; and a processing unit which supplies each voltage corresponding to an upper decision point at nearby H level, a central decision point, and a lower decision point at nearby L level, according to a voltage corresponding to the number of the errors, while changing the differences between the respective upper and lower decision points and the central decision point and moving the three decision points simultaneously with their differences kept as they are wherein each of the differences and each of the upper decision point and lower decision point depends on both the measurement result of the number of errors at the H level and the number of errors at the L level, wherein the central decision point is set at an optimum position while detecting an inner margin of an eye opening of the input data signal.

* * * * *